United States Patent
Serizawa et al.

(10) Patent No.: US 9,381,947 B2
(45) Date of Patent: Jul. 5, 2016

(54) DIVISIONAL COWL-TOP COVER

(71) Applicant: NIHON PLAST CO., LTD., Shizuoka (JP)

(72) Inventors: Daisuke Serizawa, Shizuoka (JP); Yuichi Hinata, Shizuoka (JP); Yasumasa Horimizu, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 14/445,956

(22) Filed: Jul. 29, 2014

(65) Prior Publication Data
US 2015/0035318 A1 Feb. 5, 2015

(30) Foreign Application Priority Data

Jul. 30, 2013 (JP) .................................. 2013-157805
Feb. 25, 2014 (JP) .................................. 2014-033971

(51) Int. Cl.
*B62D 25/08* (2006.01)
*B60R 21/34* (2011.01)

(52) U.S. Cl.
CPC .............. *B62D 25/081* (2013.01); *B60R 21/34* (2013.01); *B60R 2021/343* (2013.01)

(58) Field of Classification Search
CPC . B62D 25/081; B60R 21/34; B60R 2021/343
USPC ........................................................ 296/192
See application file for complete search history.

(56) References Cited

U.S. PATENT DOCUMENTS 5,692,953 A * 12/1997 Bell et al. ...................... 454/146

FOREIGN PATENT DOCUMENTS

| JP | 2005-247186 A | 9/2005 |
| JP | 2007-106366 A | 4/2007 |
| JP | 2011-005988 A | 1/2010 |
| JP | 2010-159010 A | 7/2010 |
| JP | 2011-173546 A | 9/2011 |

OTHER PUBLICATIONS

British Office Action dated Sep. 18, 2015 for corresponding British Application No. 1413462.1.

* cited by examiner

*Primary Examiner* — Glenn Dayoan
*Assistant Examiner* — Melissa A Black
(74) *Attorney, Agent, or Firm* — Arent Fox LLP

(57) ABSTRACT

The present invention is directed to a divisional cowl-top cover. In an upper cowl-top cover, a first engaging claw is formed on a front face side of a supporting portion configured to support a sealing member, and at an upper end of a lower cowl-top cover, a second engaging-receiving portion configured to engage with the first engaging claw from an upper side is formed. If an impact load acts on a hood and then the upper cowl-top cover moves downward, the first engaging claw and the second engaging-receiving portion are disengaged from each other, and the upper cowl-top cover lowers while supporting lowering of the hood, and is capable of absorbing the impact load while lowering.

7 Claims, 26 Drawing Sheets

FIG. 14
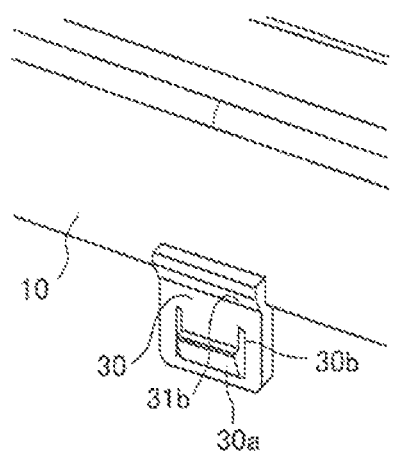
(a)
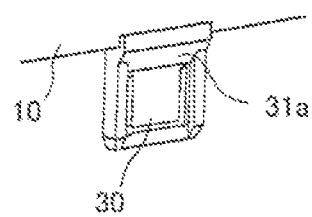
(b)
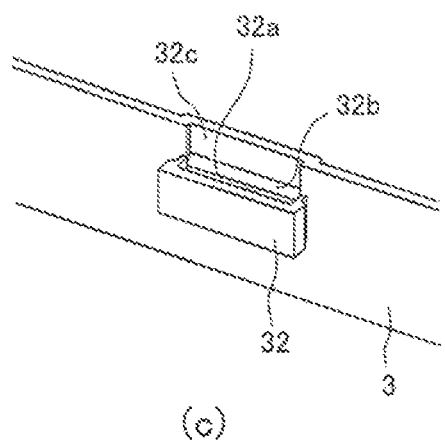
(c)

DIVISIONAL COWL-TOP COVER

CROSS REFERENCE TO RELATED APPLICATIONS

This application claims priority of Japanese Patent Application No. 2013-157805 filed on Jul. 30, 2013 and Japanese Patent Application No. 2014-033971 filed on Feb. 25, 2014. The contents of these applications are incorporated herein by reference in their entirety.

BACKGROUND OF THE INVENTION

1. Field of the Invention

The present invention relates to a divisional cowl-top cover which is provided with an impact absorption structure in an motor vehicle, the divisional cowl-top cover having a superior pedestrian protection performance thereof. It is to be noted that with respect to a forward and backward direction, a vertical direction, and a vehicle widthwise direction which are employed in the present invention, the forward and backward direction is referred to as a direction in which a cruising direction of a vehicle is defined as a forward direction with reference to the cruising direction in which the vehicle cruises. The vertical direction is referred to as a vertical direction which is defined as an upward and downward direction with respect to the vehicle, and the vehicle widthwise direction is referred to as a vehicle widthwise direction which is defined as a leftward and rightward direction when the vehicle is seen from a front side.

2. Description of the Related Art

Conventionally and up to now, as a construction of a cowl-top cover, an integrated construction has been often employed. In recent years, there has been a desire to construct an engine room so as to be small in size, and in particular, in the case of a light motor vehicle, there has been a need to construct an engine room so as to be small in size. In order to construct the engine room so as to be small in size, an engine is disposed on a cowl-top cover's side.

At this time, by employing a construction in which a cowl-top cover is integrated, the engine is constructed so as to be disposed immediately underneath the cowl-top cover. While a vehicle is in cruising, in a case where an obstacle or the like collides with the vehicle, if the obstacle or the like having thus collided therewith rolls on a hood by some change, the hood slackens downward due to an impact from the collided object.

If a vehicle-mounted part such as a engine with a high rigidity thereof is disposed at a lower side of the hood, the obstacle is also prone to severely collide with the vehicle-mounted part while the hood is slackened. In order to prevent this severe collision, there is a need to construct a shock absorption structure which is capable of mitigating the impact force from the obstacle having thus collided therewith on a cowl panel or a cowl-top cover.

As a construction for that purpose, a construction in which a cowl-top cover is divided into two sections is employed. As the construction of the cowl-top cover that is divided into two sections, a construction as shown in FIG. 25 is employed. As shown in FIG. 25, a cowl-top cover 41 is composed of two members, i.e., an upper cowl-top cover 42 and a lower cowl-top cover 43. In order to avoid interference with an engine, the lower cowl-top cover 43 is formed in an inflated shape to a rear side of a vehicle.

The upper cowl-top cover 42 is constructed in a shape extending from a top part of a front edge part of a front glass 46 to a lower side of a rear edge part of a hood 45, and in so far as the lower cowl-top cover 43 is concerned, a supporting portion of a sealing member 47 configured to elastically support a rear face side of the hood 45 is formed at an upper end part, and at a lower end part, a connecting portion 48 which is coupled to a vehicle body panel 44 is formed.

The upper cowl-top cover 42 and the lower cowl-top cover 43 are coupled to and are fixed to each other by way of thermal swaging portion 49 at a plurality of sites along the vehicle widthwise direction. By way of the above mentioned coupling and fixing exerted by the thermal swaging portion 49, the cowl-top cover 41 that is constructed so as to be divided into two sections can be handed as if it were an integrated cowl-top cover, and transportation or mounting work of the cowl-top cover 41 can be easily carried out.

However, in order to facilitate the transportation or mounting work of the cowl-top cover 41 that is structured so as to be divided into two sections, there is a need to increase the strength of securing the thermal swaging portion 49. However, if the strength of securing the thermal swaging portion 49 is increased, when an impact load along a vertical direction with respect to the thermal swaging portion 49 acts therein, it becomes difficult to shear and break the thermal swaging portion 49. Conversely, in a case where the strength of securing the thermal swaging portion 49 is reduced, the upper cowl-top cover 42 and the lower cowl-top cover 43 are easily decoupled from each other in the middle of transportation or in the middle of assembling activity.

In addition, as a cowl-top cover having an impact absorption structure, there has been proposed an impact absorption structure for motor vehicle or the like as described in Japanese Unexamined Patent Application Publication No. 2007-106366. In the motor vehicle impact absorption structure as described in Japanese Unexamined Patent Application Publication No. 2007-106366, as shown in FIG. 26, a cowl grill 51 extending in a vehicle widthwise direction (which is equivalent to the top cowl-top cover in the present invention) is constructed so as to be divided into two sections, i.e., a cowl grill upper part 52 (which is equivalent to the upper cowl-top cover in the present invention) and a cowl grill front part 53 (which is equivalent to the lower cowl-top cover in the present invention).

The cowl grill upper part 52 is constructed in a shape extending from a top part of a front edge part of a front window, although not shown, which is arranged at the right side as illustrated all over a lower part of a rear edge part of a hood 55, and the cowl-grill front part 55 is constructed in a shape extending from a front edge part of the cowl grill upper part 52 to a lower side. At the front end side of the down grill upper part 52, a bank part 63 which is stepped up by one step is formed, a front end part of the bank part 63 bends downward, and a reinforcement part 62 which is extensively provided downward is formed.

At the cowl grill front part 53, there are formed: a front wall part 57 which is longitudinally oriented and of which an upper end part is slightly inclined forward; and an overlap part 58 of which an upper end part of the front wall part 57 is bent to the front window side and extensively provided. At a lower end part of the front wall part 57, a connecting portion 59 extending forward is formed. On a front face of the front wall part 57, a noise absorption member 61 for cowl grill is fixed by way of screw, and in the middle of the front wall part 57, a vulnerable part 60 to be provided with respect to an impact load which is applied from an upper side is formed.

In addition, the overlap part 58 is overlapped with the bank part 63 that is formed at the cowl grill upper art 52, whereby an upper end part of the cowl grill front part 57 can be supported at the cowl grill upper part 52. The connecting portion 59 can be overlapped with an upper end part of the cowl front panel 54 (which is equivalent to a vehicle body panel in the present invention), and the front wall part 57 and the cowl front panel 54 are connected to each other. An overlap portion between the bank portion 63 and the overlap part 58 and an overlap portion between the connecting portion 59 and the cowl front panel 54 are coupled to and are fixed to each other in a state in which these overlap portions are overlapped with each other by way of a fixture such as a screw.

In the thus constructed cowl grill 51, an impact load acts on the hood 55, and when the hood 55 slackens downward, as indicated by the double-dotted chain line, the cowl grill front part 53 is bent and deformed around the vulnerable part 60 that is formed at the cowl grill front part 53, and deformation of the hood 55 can be accelerated. In this manner, an impact force which is produced with respect to the obstacle rolled on the hood 55 can be mitigated.

In the invention as described in Japanese Unexamined Patent Application Publication No. 2007-106366, the overlap part 58 between the cowl grill upper part 52 and the cowl grill front part 53 and the band part 63 are constructed so as to be coupled to and fixed to each other by way of a fixture. Therefore, in a case where an impact load acts on the hood 55 and then the hood 55 slackens downward, when the cowl grill front part 53 that is supported by the cowl grill upper part 52 is established in a stretched state without being bent or deformed while it is supported, a downward deformation of the hood 55 is restrained.

If the cowl grill front part 53 maintains a stretched state thereof without being bent or deformed when the impact load acts, the impact load that is applied from the hood 55 cannot be efficiently absorbed by the cowl grill 51.

In addition, the cowl grill front part 53 forming the vulnerable past 60 is employed and thus the cowl grill front part 53 must be manufactured in a customized fashion at the time of manufacturing the cowl grill 51, resulting in an increase of manufacturing costs. Further, this cowl grill has the vulnerable part 60 and thus it becomes difficult to ensure management of the rigidity of the cowl grill front part 53 itself.

SUMMARY Of THE INVENTION

The present invention aims to provide a divisional cowl-top cover which is capable of solving the conventional problem as described above, and which is capable of efficiently absorbing an impact load acting on a hood.

An object of the present invention can be achieved by a divisional cowl-top cover according to first to sixth aspects of the present invention as described below. That is, the divisional cowl-top cover according to a first aspect of the present invention is directed to a divisional cowl-top cover which is disposed among a lower end part of a front glass of a motor vehicle, a rear end part of a hood, and an upper end part of a vehicle body panel, and which includes an upper cowl-top cover and a lower cowl-top cover, and the divisional cowl-top cover is most primarily provided in such a manner that:

the upper cowl-top cover has an upper cowl-top cover main body and a first engaging portion which is positioned at a lower side of the hood, and which is provided in front of the upper cowl-top cover main body, the lower cowl-top cover has a lower cowl-top cover main body which is positioned so as to be lower than the upper cowl-top cover and a second engaging portion which is formed at an upper end of the lower cowl-top cover main body, and which engages with the first engaging portion, the upper cowl-top cover and the lower cowl-top cover are coupled to each other by way of an engagement between the first engaging portion and the second engaging portion, and by an impact load acting on the hood and the upper cowl-top cover, the first engaging portion moves downward from an engaged position, whereby the upper cowl-top cover and the lower cowl-top cover are disengaged from each other, and a downward movement of the upper cowl-top cover is permitted.

The divisional cowl-top cover according to a second aspect of the present invention is primarily provided in such a manner that:

a supporting portion is provided in front of the upper cowl-top cover main body, a sealing member coming into pressure contact with a back face of the hood is provided at one end part of the supporting portion, the first engaging portion is provided at the other end part of the supporting portion, and such one end side part's side of the supporting portion is arranged in an inclined to the front glass side or front side.

The divisional cowl-top cover according to a third aspect of the present invention is primarily provided in such a manner that:

a supporting portion is provided in front of the upper cowl-top cover main body, a sealing member coming into pressure contact with a back face of the hood is provided at one end part of the supporting portion, the first engaging portion is provided at the other end part of the supporting portion, at the other end part of the supporting portion or at an upper end part of the lower cowl-top cover main body, an engaging-receiving portion having an engagement hole penetrating in a substantially vertical direction is constructed as the first engaging portion or the second engaging portion, and at an upper end part of the lower cowl-top cover main body or at the other end part of the supporting portion, an engaging claw which is inserted into the engagement hole and which engages with the engaging-receiving portion is constructed as the second engaging portion or the first engaging portion.

The divisional cowl-top cover according to a fourth aspect of the present invention is primarily provided in such a manner that an inclined face which is inclined downward is formed between an insert opening part of the engagement hole and the engaging claw. In addition, the divisional cowl-top cover according to a fifth aspect of the present invention is primarily provided in such a manner that a vulnerable part is formed at the engaging-receiving portion and/or the engaging claw.

The divisional cowl-top cover according to a sixth aspect of the present invention is primarily provided in such a manner that, by the impact load, the upper cowl-top cover and the lower cowl-top cover are disengaged from each other, and by abutment with the upper cowl-top cover moving downward, the lower cowl-top cover is constructed so as to be turnable forward.

In any one of the first to sixth aspects of the present invention, if a downward impact load is applied to a hood and/or an upper cowl-top cover, a downward compression force acts an the upper cowl-top cover and then the upper cowl-top cover moves downward. A second engaging portion which is formed at an upper end of a lower cowl-top cover main body and a first engaging portion of the upper cowl-top cover can be easily disengaged from each other.

When the upper cowl-top cover and the lower cowl-top cover are thus disengaged from each other, the upper cowl-top cover does not need to be bottomed, and the impact load acting on the hood and/or the upper cowl-top cover can be reliably absorbed by a downward movement. A degree of stretching of the cowl-top cover when the hood is lowered by the impact load can be prevented.

That is, in a case where the impact load acts on the hood, or alternatively, in a case where the impact load acts simultaneously on the hood and the upper cowl-top cover, the hood is lowered by the impact load. At this time, a first engaging portion moves downward and then disengages the first engaging portion and a second engaging portion from each other, whereby the upper cowl-top cover and the lower cowl-top cover can be disengaged from each other. A state in which the cowl-top cover is stretched with respect to lowering of the hood can be prevented.

In addition, in a case where an impact load acts on the upper cowl-top cover, the first engaging portion that is provided at a front end of the upper cowl-top cover moves downward, and the first engaging portion and the second engaging portion are disengaged from each other, whereby the upper cowl-top cover and the lower cowl-top cover can be decoupled from each other. Further, occasionally a compression force to displace anything downward acts on the hood as well due to a pressure reception area of an impact load. In this case as well, the first engaging portion moves downward, and the upper cowl-top cover and the lower cowl-top cover can be disengaged from each other, and thus, the state in which the cowl-top cover is stretched with respect to lowering of the hood can be prevented.

Furthermore, in so far as assembling work between the upper cowl-top cover and the lower cowl-top cover is concerned, these two cowl-top covers can be easily integrated with each other by engaging the first engaging portion and the second engaging portion with each other and thus an assembling work of the cowl-top covers to a vehicle body can be improved.

In any one of the first to sixth aspects of the present invention, one end part's side of a supporting portion at which a seating member earning into pressure contact with a back face of the hood can be arranged in an inclined state to a forward side or a rear side of a vehicle, and can be constructed such that the first engaging portion is provided on the other end part's side of the supporting portion.

By employing such a construction, one end part's side of the supporting portion is easily fallen down to a front glass side which is a front side or a rear side by the impact load acting on the hood and/or the upper cowl-top cover. The impact load can be concentrated on the other end part's side of the supporting portion, and the first engaging portion and the second engaging portion can be reliably disengaged from each other.

In any one of the first to sixth aspects of the present invention, a first engaging portion and a second engaging portion are constructed by employing an engaging-receiving portion having an engagement hole penetrating in a substantially vertical direction and an engaging claw engaging with the engaging-receiving portion. By employing such a construction, engagement work between the first engaging portion and the second engaging portion can be carried out for a short period of time and with ease.

In addition, an inclined face which is inclined downward, can be formed between an insert opening part of the engagement hole and the engaging claw. By forming the inclined face, the impact load acting on the hood and/or the upper cowl-top cover also acts on the inclined face via the supporting portion, and it is possible to increase the size of the engagement hole or to break the engagement hole. In this manner, the first engaging portion and the second engaging portion can be easily disengaged from each other.

Further, in order to easily break the engagement hole, a vulnerable part can be formed at the engaging-receiving portion. In addition, in order to easily break the engaging claw itself, a vulnerable part can be formed at the engaging claw.

In any one of the first to sixth aspects of the present invention, the upper cowl-top cover moving downward abuts against the lower cowl-top cover, the lower cowl-top cover can turn forward. In this manner, by way of the energy that is consumed by forward turning exerted by the lower cowl-top cover, the energy of the impact load that lowers the hood and/or the upper cowl-top cover can be further efficiently absorbed. Moreover, when the hood and/or upper cowl-top cover are lowered by the impact load, the state in which the cowl-top cover is stretched can be efficiently prevented.

BRIEF DESCRIPTION OF THE DRAWINGS

FIG. 14 is perspective view of essential parts between an engaging-receiving portion and an engaging claw (the fourth embodiment);

FIG. 18 (b) is a perspective view of essential parts of an engaging claw in another construction, and FIG. 18 (c) is a sectional view taken along the line C-C (the fourth embodiment);

DESCRIPTION OF THE PREFERRED EMBODIMENTS

Hereinafter, preferred embodiments of the present invention will be specifically described with reference to the accompanying drawings. As a cowl-top cover according to the present invention, in addition to shapes or construction, which will be described hereinafter, any other shape or construction can be employed as long as it can solve the above-described problem to be solved by the present invention. Therefore, the present invention is not limited to the embodiments described hereinafter, and a variety of modifications can occur without departing from the scope and spirit of the present invention.

[First Embodiment]

Figure 1:
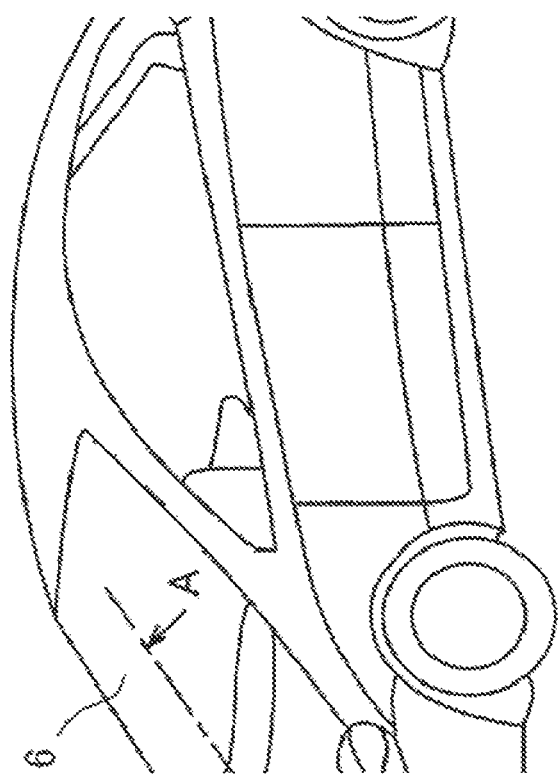
FIG. 1 is a perspective view of a vehicle according to an embodiment of the present invention.

As FIG. 1 shows a perspective view of a vehicle, a cowl-top cover 1 having a lengthwise dimension along a vehicle widthwise direction is arranged between a front end part of a front glass 6 and a hood 5. The cowl-top cover 1, as shown in FIG. 2, covers a region between a rear end part of the hood 5 that covers an upper part of a front compartment in which a vehicle-mounted part such as an engine 18 is disposed and a front end part of the front glass 6.

At a front end part's side of the front glass 6, a wiper, although not shown, for appropriately keeping a field of view of the front glass 6 covered with rain or snow or the like, is provided, and a motor configured to drive the wiper is housed in a space which is covered with the cowl-top cover 1.

Figure 2:
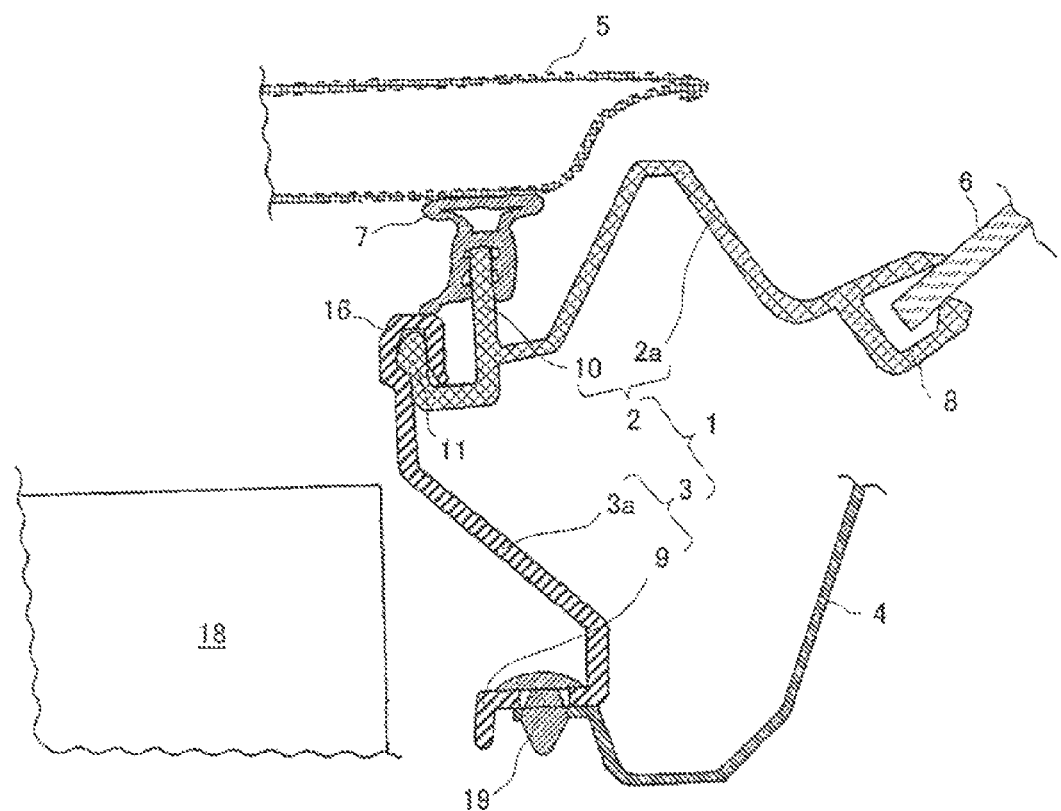
FIG. 2 is a sectional view taken along the line A-A of FIG. 1 (a first embodiment)

The cowl-top cover 1, as shown in FIG. 2 which is a sectional view taken long the line A-A of FIG. 1, is constructed so as to be divide into two sections, i.e., an upper cowl-top cover 2 and a lower cowl-top cover 3 which is coupled to the upper cowl-top cover 2. The upper cowl-top cover 2 and the lower cowl-top cover 3 that are divided into two sections are coupled to each other, thereby constitute an integrated cowl-top cover 1.

The upper cowl-top cover 2 can be constructed as being made of a synthetic resin, and the lower cowl-top cover 3 can be constructed as being made of a synthetic resin or a metal.

The upper cowl-top cover 2 is constructed with an upper cowl-top cover main body 2a and a supporting portion 10, and at a rear end side of the upper cowl-top cover main body 2a, an engagement portion 8 configured to pinch the front end part of the front glass 6 is formed. At a front end side of the upper cowl-top cover main body 2a, the supporting portion 10 configured to support a sealing member is formed. The sealing member 7 comes into pressure contact with a back face at a rear end side of the hood 5, and seals a space between the sealing member and a back face side of the hood 5 in a liquid tight stage. In addition, this sealing member is constructed in a shape having a lengthwise direction along a vehicle widthwise direction.

Although FIG. 2 illustrates a construction in which a recessed portion formed in the sealing member 7 is mounted to the upper cowl-top cover 2 in such as manner as to be sandwiched between upper end parts of the supporting portion 10, a conventionally publicly known mounting method can be employed as a construction configured to mount the sealing member 7 to the upper cowl-top cover 2.

Even in a case where the conventionally publicly known mounting method has been employed, if an impact load moving downward acts on the hood 5 as described later, there is a need to employ a construction which is capable of moving the supporting portion 10 downward by way of downward movement of the hood 5 in order to attain an advantageous effect in the present invention. That is, there is a need to employ a construction in which downward movement of the hood can be received by the supporting portion 10.

Figure 3:
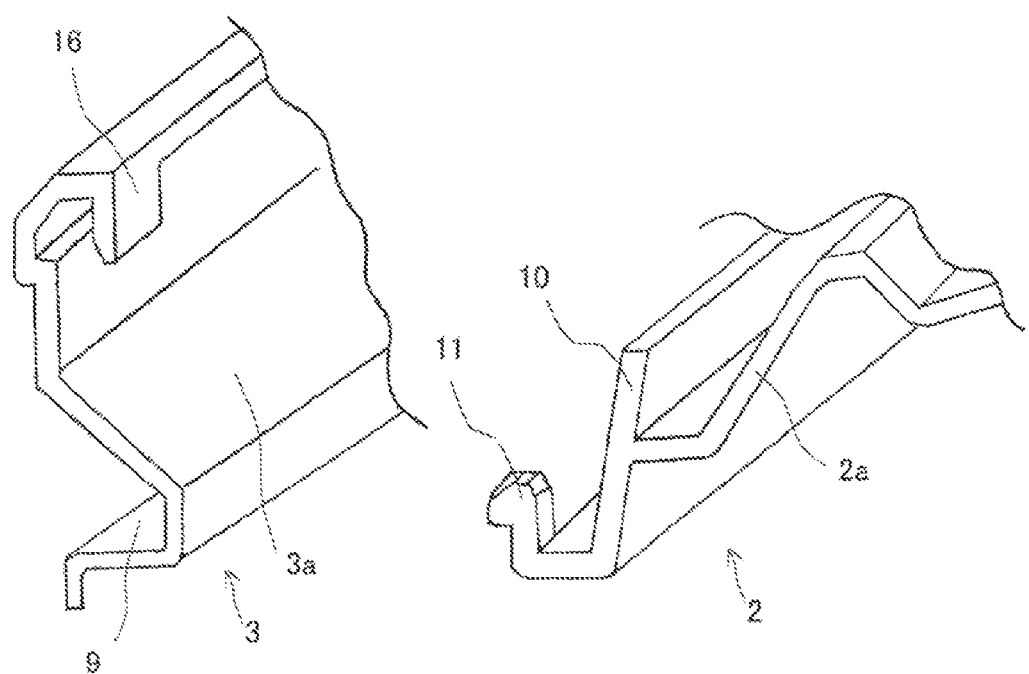
FIG. 3 is an exploded perspective view showing essential parts of a cowl-top cover (the first embodiment)
Figure 5:
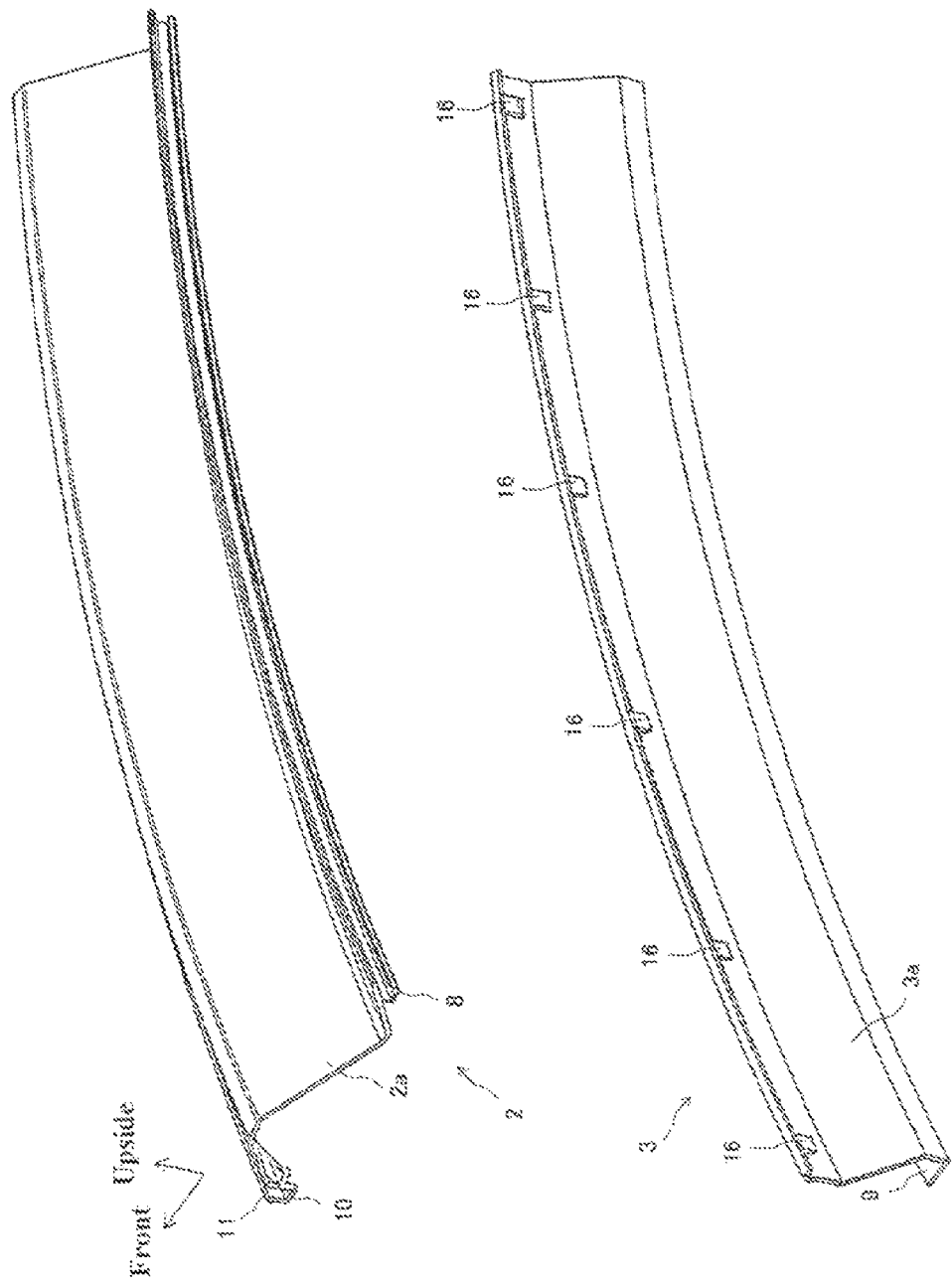
FIG. 5 is an entirely exploded perspective view of the cowl-top cover (the first embodiment)

As shown in FIG. 2, FIG. 3, and FIG. 5, a first engaging claw 11 serving as a first engaging portion, which is protrusively provided forward, is formed at a proximal end of the supporting portion 10.

The first engaging claw 11 is capable of achieving insertion and engagement from a lower side to an upper side with respect to a second engaging-receiving portion 16 serving as a second engaging portion, which is formed at an upper end part of the lower cowl-top cover 3. Conversely, this claw is also capable of inserting and engaging the second engaging-receiving portion 16 from an upward direction to a downward direction with respect to the first engaging claw 11. In addition, the first engaging claw 11 is pulled in a downward direction with respect to the second engaging-receiving portion 16, whereby the engaging claw can be disengaged from the second engaging-receiving portion 16.

The lower cowl-top cover 3 is constructed with a lower cowl-top cover main body 3a and a connecting portion 9. At an upper end part of the lower cowl-top cover main body 3a, a second engaging-receiving portion 16 is formed. At a lower end part of the lower cowl-top cover main body 3a, a connecting portion 9 is extensively provided and formed. The connecting portion 9 is connected and fixed to a vehicle body panel 4 via a fixture 19 such as a slip or a screw. In addition, as a shape in a side view of the lower cowl-top cover 3, an inclined face which is inclined to a front side is formed between a lower end part's side and an upper end part's side. In an illustrative example, the second engaging-receiving portion 16 is arranged and disposed so as to be more foreside than the fixture 19 by way of the inclined face.

The first engaging claw 11 and the second engaging-receiving portion 16 are respectively formed in plurality along a vehicle widthwise direction. In a case where a state in which the upper cowl-top cover 2 and the lower cowl-top cover 3 are coupled to each other is weak in only a state in which the first engaging claw 11 and the second engaging-receiving portion 16 are engaged with each other, there may be a difficulty in transportation of an integrated cowl-top cover 1. Thus, between the upper cowl-top cover 2 and the lower cowl-top cover 3, simple welding and fixing can be applied at a plurality of sites along the vehicle widthwise direction.

As a securing strength in welding and fixing at this time, easy shearing can be carried out when the upper cowl-top cover 2 has moved downward at an impact load acting on the hood 5 and/or the upper cowl-top cover 2. In addition, disengagement between the first engaging claw 11 and the second engaging-receiving portion 16 is not prevented, and at the time of transportation or mounting work of the cowl-top cover 1, in corporation with the engaged state exerted by the first engaging claw 11 and the second engaging-receiving portion 16, a securing strength is obtained to an extent such that the upper cowl-top cover 2 and the lower cowl-top cover 3 are not decoupled from each other.

A construction configured to engage the first engaging claw 11 and the second engaging-receiving portion 16 with each other can be formed in a shape in which the first engaging claw 11 is moved downward from an engaged position, whereby an engaged state therebetween can be easily released.

That is, in order to establish the engaged state, the engaged state can be formed by achieving insertion and engagement from a lower side to an upper direction with respect to the second engaging-receiving portion 16 that is a counterpart of the first engaging claw 11. Alternatively, the engaged state can be formed by inserting and engaging the second engaging-receiving portion 16 from an upper side to a downward direction with respect to the first engaging claw 11. Conversely, the engaged state can be released by moving the first engaging claw 11 or the second engaging-receiving portion 16 in an opposite direction to the inserted and engaged direction.

In particular, the present invention is an invention relating to the cowl-top cover 1, and is provided in such a manner that a downward displacement of the hood 5 and/or the upper cowl-top cover 2 by an impact load is not prevented by the cowl-top cover 1 itself. The present invention is provided in such a manner that the cowl-top cover 1, in particular, the upper cowl-top cover 2 is further deformed downward in a state in which it is decoupled from the lower cowl-top cover 3 so as to be thereby able to absorb the impact load.

Thus, as a construction configured to permit the upper cowl-top cover 2 to move downward with the impact shock, there is employed a construction in which the first engaging claw 11 provided at the upper cowl-top cover 2 moves downward together with a downward movement of the upper cowl-top cover 2 and then disengages from the second engaging-receiving portion 16.

If the upper cowl-top cover 2 and the lower cowl-top cover 3 are disengaged from each other, both of these covers are decoupled from each other, and the upper cowl-top cover 2 can further move downward while absorbing the energy of the impact load acting on the hood 5 and/or the upper cowl-top cover.

Next, with reference to FIG. 4, a description will be given with respect to a case in which an obstacle 20 having collided with a cruising vehicle rolls on a hood 5 and then an impact load as indicated by the contoured arrow acts on the hood 5. It is to be noted that even in a case where the obstacle 20 acts on an upper face of the upper cowl-top cover main body 2a, the first engaging claw 11 provided at a front end of the upper cowl-top cover 2 moves downward, the first engaging claw 11 and the second engaging-receiving portion 16 can be disengaged from each other, and the upper cowl-top cover 2 and the lower cowl-top cover 3 can be decoupled from each other.

In addition, occasionally, in a case where a pressure reception area with respect to the obstacle 20 is large, even if the obstacle 20 first collides with the upper cowl-top cover main body 2a, the obstacle 20 abuts against the hood 5 as well in the middle of lowering of the upper cowl-top cover 2, and a downward impact force acts on the hood 5 as well. By way of a compression force from the hood 5 or by lowering of the upper cowl-top cover 2, the first engaging claw 11 is moved downward, and the first engaging claw 11 and the second engaging-receiving portion 16 can be disengaged from each other.

In a case where the obstacle 20 collides with the hood 5 and the upper cowl-top cover main body 2a at the same time, the hood 5 and the upper cowl-top cover 2 are lowered by the impact load, the first engaging claw 11 moves downward, and the first engaging claw 11 and the second engaging-receiving portion 16 can be disengaged from each other.

Therefore, a description will be given hereinafter with respect to a case in the obstacle 20 rolls on the hood 5, and a description is omitted with respect to a case in which the obstacle 20 collides with the upper cowl-top cover main body 2a, or alternatively, a case in which the obstacle 20 collides with the hood 5 and the upper cowl-top cover main body 2a at the same time.

It is to be noted that, even in the case where the obstacle 20 collides with the upper cowl-top cover main body 2a, or alternatively, in the case where the obstacle 20 collides with the hood 5 and the upper cowl-top cover main body 2a at the same time, the present invention can attain functions and advantageous effects which are similar to those described hereinafter.

Figure 4:
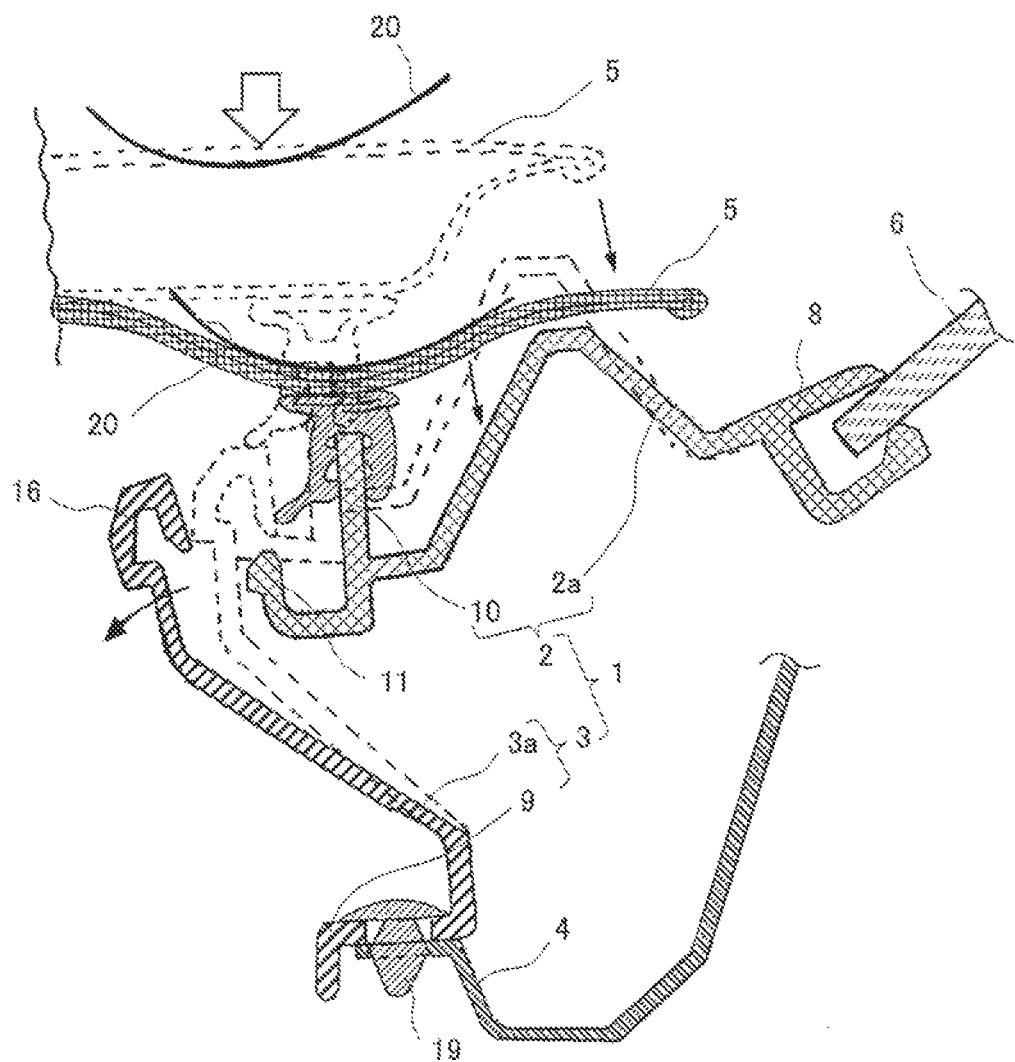
FIG. 4 is a sectional view taken along the line A-A of FIG. 1, showing a behavior of the cowl-top cover when an impact load acts thereon (the first embodiment)

In FIG. 4, the state indicated by the dotted line indicates an initial state in which the obstacle 20 rolls on the hood 5, and the state indicated by the solid line indicates a state in which the hood 5 and the upper cowl-top cover 2 are moved downward by the obstacle 20. The impact load from the obstacle 20 acting on the hood 5 is transmitted to the upper cowl-top cover 2 via the supporting portion 10 of the upper cowl-top cover 2.

The upper cowl-top cover 2 moves downward, whereby the first engaging claw 11 and the second engaging-receiving portion 16 are disengaged from each other. That is, if the supporting portion 10 moves downward, the first engaging claw 11 turns an engagement front end side of the second engaging-receiving portion 16 in the counterclockwise direction as shown in the figure, and the first engaging claw 11 and the second engaging-receiving portion 16 are disengaged from each other.

At a stage which is earlier than when the first engaging claw 11 and the second engaging-receiving portion 16 are disengaged from each other, at a site at which the upper cowl-top cover 2 and the lower cowl-top cover 3 are welded and fixed to each other, a relative slippage takes place between such a site and the lower cowl-top cover 3 due to a downward movement of the supporting portion 10, and owing to this slippage, the welding and fixing is sheared, and the welded state is released.

If the first engaging claw 11 and the second engaging-receiving portion 16 are disengaged from each other, the upper cowl-top cover 2 is completely decouples from the lower cowl-top cover 3, the upper cowl-top cover having thus decoupled therefrom moves downward without being constrained, the upper cowl-top cover having thus moved can be disengaged therefrom, and an impact force from the obstacle 20 can be absorbed. If a lower end side of the supporting portion 10 abuts against the lower cowl-top cover 3 at the time of downward movement and disengagement of the upper cowl-top cover 2, the lower cowl-top cover 3 is turned to the front side by an inclined face which is formed in the lower cowl-top cover 3. The lower cowl-top cover 3 is turned to the front side by way of the upper cowl-top cover 2, whereby the energy exerted by the impact load can be absorbed more efficiently.

A state in which the cowl-top cover 1 and the front glass 6 are engaged with each other absorbs vibration of the front glass, and thus, in general, this engaged state is established as a state in which the engagement portion 8 is biased toward the side of the front glass 6. By employing such a construction, if the first engaging claw 11 and the second engaging-receiving portion 16 are disengaged torn each other, the supporting portion 10 that is formed in the front end part's side of the upper cowl-top cover 2 moves to a front side as well, and easily abuts against the lower cowl-top cover 3. In addition, the lower cowl-top cover 3 can be easily turned toward the front side.

Thus, the upper cowl-top cover 2 is disengaged from the lower cowl-top cover 3 and thus the disengaged cover does not interfere with lowering of the hood 5. In addition, the lower cowl-top cover 3 also turns to the forward side and thus the turning cover does not interfere with lowering of the hood 5.

[Second Embodiment]

Figure 6:
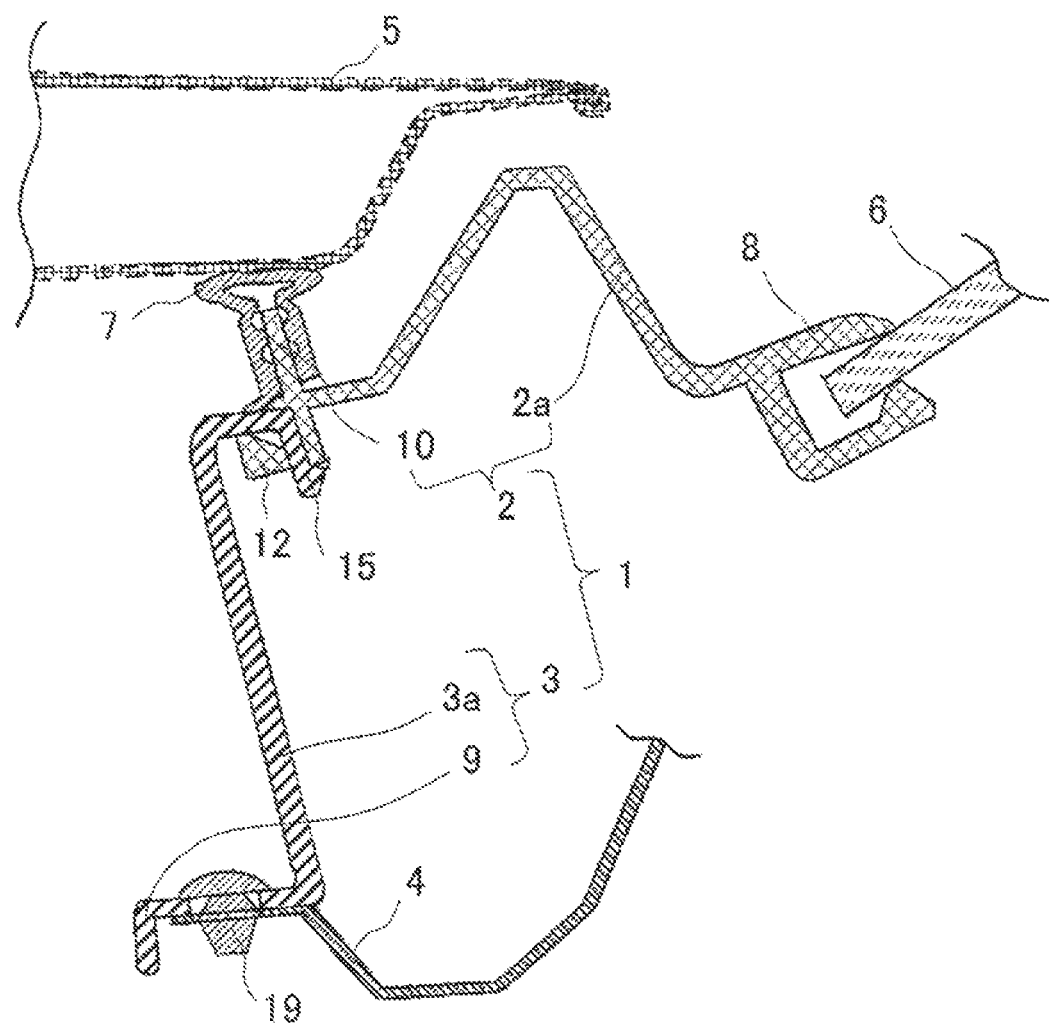
FIG. 6 is a sectional view taken along the line A-A in FIG. 1 of another cowl-top cover (a second embodiment)
Figure 7:
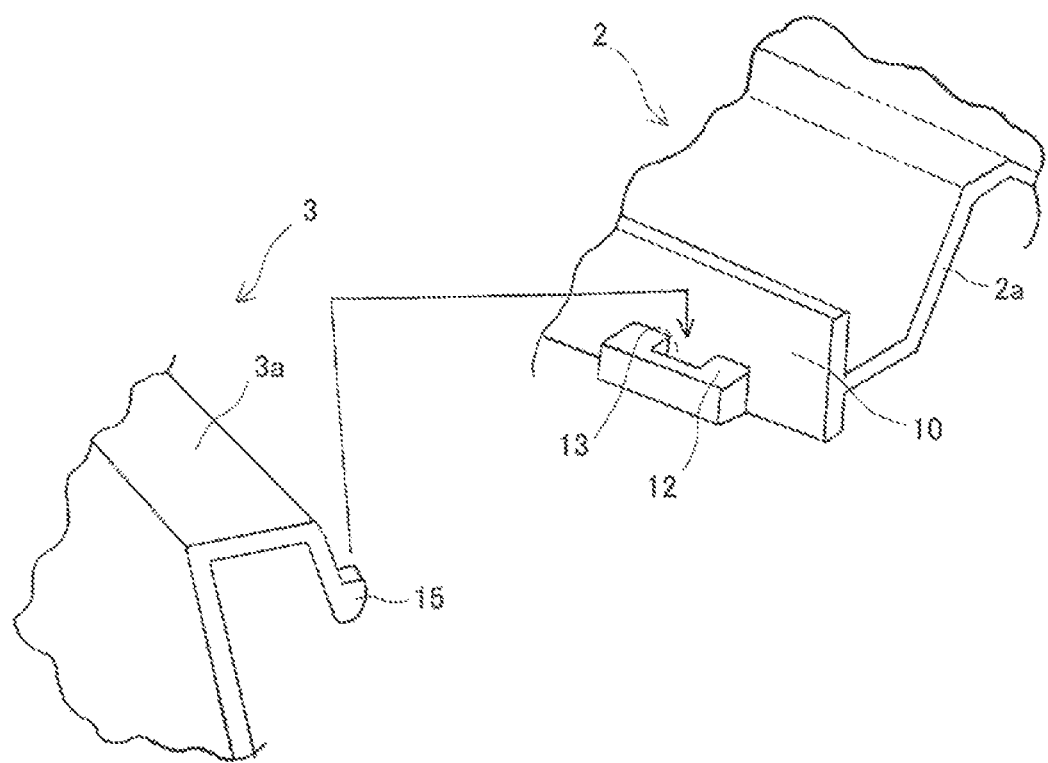
FIG. 7 is an exploded perspective view of such another cowl-top cover (the second embodiment)

With reference to FIG. 6 and FIG. 7, a construction of a second embodiment of the present invention will be described. In the first embodiment, a description has been given with respect to the construction in which the first engaging claw 11 serving as the first engaging portion is formed in the upper cowl-top cover 2, and the second engaging-receiving portion 16 serving as the second engaging portion is formed in the lower cowl-top cover 3. In the second embodiment, there is employed a construction in which a first engaging-receiving portion 12 serving as a first engaging portion is formed in an upper cowl-top cover 2, and a second engaging claw 15 serving as a second engaging portion is formed in a lower cowl-top cover 3. Other constituent elements are similar to those in the first embodiment, like constituent elements are designated by like reference numerals, and a duplicate description is omitted.

As shown in FIG. 7, the first engaging-receiving portion 12 is formed in a shape protruding from a front face of a supporting portion 10, and an engagement hole 13 configured to insert and engage the second engaging claw 15 that is formed rearward is formed at an upper end part of the lower cowl-top cover 3. The first engaging-receiving portion 12 and the second engaging claw 15 are respectively formed in plurality along a vehicle widthwise direction. In addition, as is the case with the first embodiment, in order to retain the upper cowl-top cover 2 and the lower cowl-top cover 3 so as to be coupled to and integrated with each other, at a plurality of site along the vehicle widthwise direction, welding and fixing are applied between the upper cowl-top cover 2 and the lower cowl-top cover 3 as required.

As indicated by the arrow in FIG. 7, the second engaging claw 15 is inserted into an engagement hole 13 of the first engaging-receiving portion 12 from an upper side, whereby the upper cowl-top cover 2 and the lower cowl-top cove 3 can be coupled to each other. When a downward impact acts on the hood 5 and then the upper cowl-top cover 2 moves downward, the engagement hole 13 and the second engaging claw 15 are disengaged from each other, and the upper coup-top cover 2 is decoupled from the lower cowl-top cover 3. That is, if the first engaging-receiving portion 12 moves downward, a front end part of the second engaging claw 15 that engages with the engagement hole 13 is elastically deformed to a lower front side, the second engaging claw 15 disengages from the engagement hole 13, and the engagement hole 13 and the second engaging claw 15 are disengaged from each other.

If the first engaging-receiving portion 12 abuts against the lower cowl-top cover 3 at the time of lowering of the upper cowl-top cover 2, the lower cowl-top cover 3 is turned in a forward direction. Thus, the cowl-top cover 1 disengaged in a state in which the cove is divided into two sections, and the upper cowl-top cover 2 moves downward and can be disengaged therefrom, and thus, the impact load acting on the hood 5 and/or the upper cowl-top cover 2 can be absorbed and mitigated.

[Third Embodiment]

Figure 8:
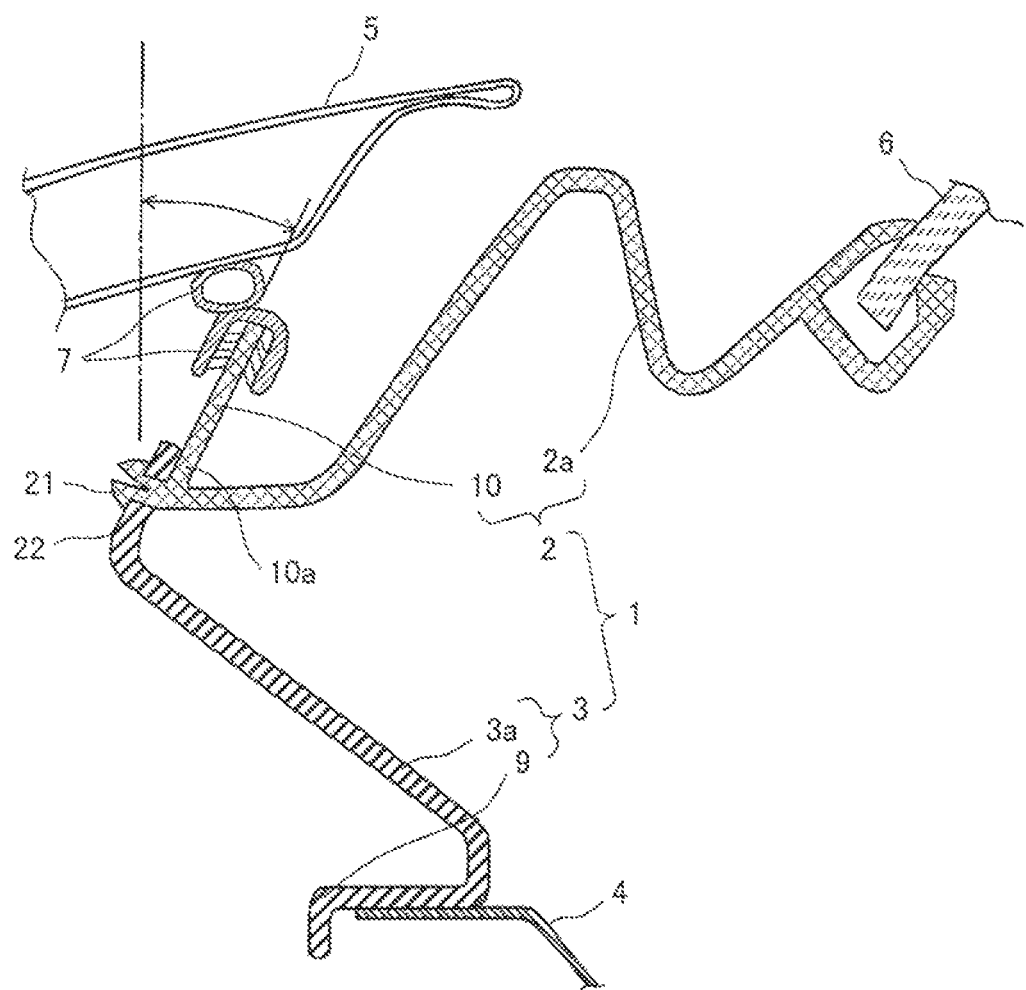
FIG. 8 is a sectional view taken along the line A-A of FIG. 1 (a third embodiment)

With reference to FIG. 8 to and FIG. 10, a construction of a third embodiment of the present invention will be described. In the first embodiment, a description has been given with respect to the construction in which the first engaging claw 11 serving as the first engaging portion is formed in the upper cowl-top cover 2, and the second engaging-receiving portion 16 serving as the second engaging portion is formed in the lower cowl-top cover 3. In the third embodiment, there is employed a construction in which a third engaging claw 21 serving as a first engaging portion is formed in an upper cowl-top cover 2, and a third engaging-receiving portion 22 shaped like a hole, serving as a second engaging portion, is formed in a lower cowl-top cover 3.

Other constituent elements are similar to those in the first embodiment, like constituent elements are designated by like reference numerals, and a duplicate description is omitted. In addition, illustration of the fixture 19 fixing the connecting portion 9 of the lower cowl-top cover 3 to the vehicle body panel 4 (reference should be made to FIG. 2) is also omitted.

As shown in FIG. 8, a layout and construction are employed in such a manner that one end part's side of a supporting portion 10 configured to support a sealing member 7 is inclined to the side of a front glass 6, and the other end part 10a of the supporting portion 10 is arranged at a position proximal to a third engaging claw 21. The third engaging claw 21 is provided at a tip end part of the upper cowl-top cover 2, and is laid out and constructed so as to protrude to a front side of a vehicle.

At an upper end part's side of the lower cowl-top cover 3, a insertion hole penetrating an upper end part of the lower cowl-top cover 3 in a forward and backward direction is formed, and a third engaging claw 21 can be inserted into a through hole. A third engaging-receiving portion 22 is formed by the insertion hole. The third engaging claw 21 and the third engaging-receiving portion 22 can be arranged in plurality along a widthwise direction of the cowl-top cover.

Figure 9:
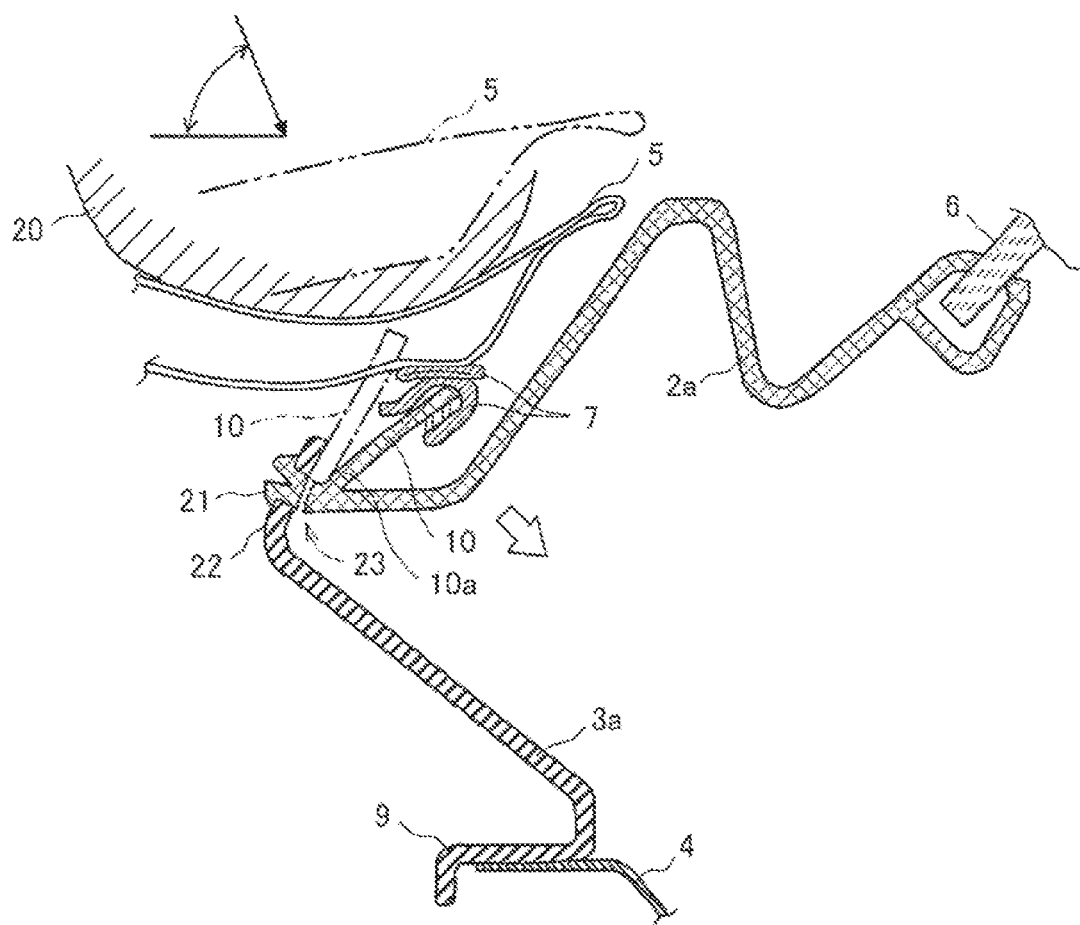
FIG. 9 is a sectional view taken along the line A-A of FIG. 1, showing a behavior of a cowl-top cover when an impact load acts thereon (the third embodiment)

By employing such a construction, when an obstacle 20 rolls on a hood 5 as shown in FIG. 9, the hood 5 is downwardly lowered by an impact load exerted by the obstacle 20. By the impact load, the supporting portion 10 can cause one end part's side mounting a sealing member 7 around the side of the other end part 10a to easily fall down to the side of the front glass 6.

A bending stress concentrates on the other end part 10a of the supporting portion 10, and the third engaging claw 21 breaks and separates from the upper cowl-top cover 2. This break portion is designated by reference numeral 23, and is illustrated in FIG. 9. In this manner, the upper cowl-top cover 2 and the lower cowl-top cover 3 are reliably disengaged from each other. A downward movement of the hood 5 and the upper cowl-top cover 2 is permitted, and the impact load acting on the hood 5 can be absorbed and mitigated. Even in a case where the impact load directly acts on the upper cowl-top cover 2, the impact load can also be absorbed and mitigated in the same manner as that described above.

As a construction in the third engaging claw 21 serving as the first engaging portion, a description has been given with respect to a construction configured to protrude to a from side at a tip end part of the upper cowl-top cover 2, and as a construction in the third engaging-receiving portion 22 serving as the second engaging portion, a description has been given with respect to a construction of an insertion hole which is formed at an upper end part's side of the lower cowl-top cover 3, and however, the present invention is not limited to these constructions.

Figure 10:
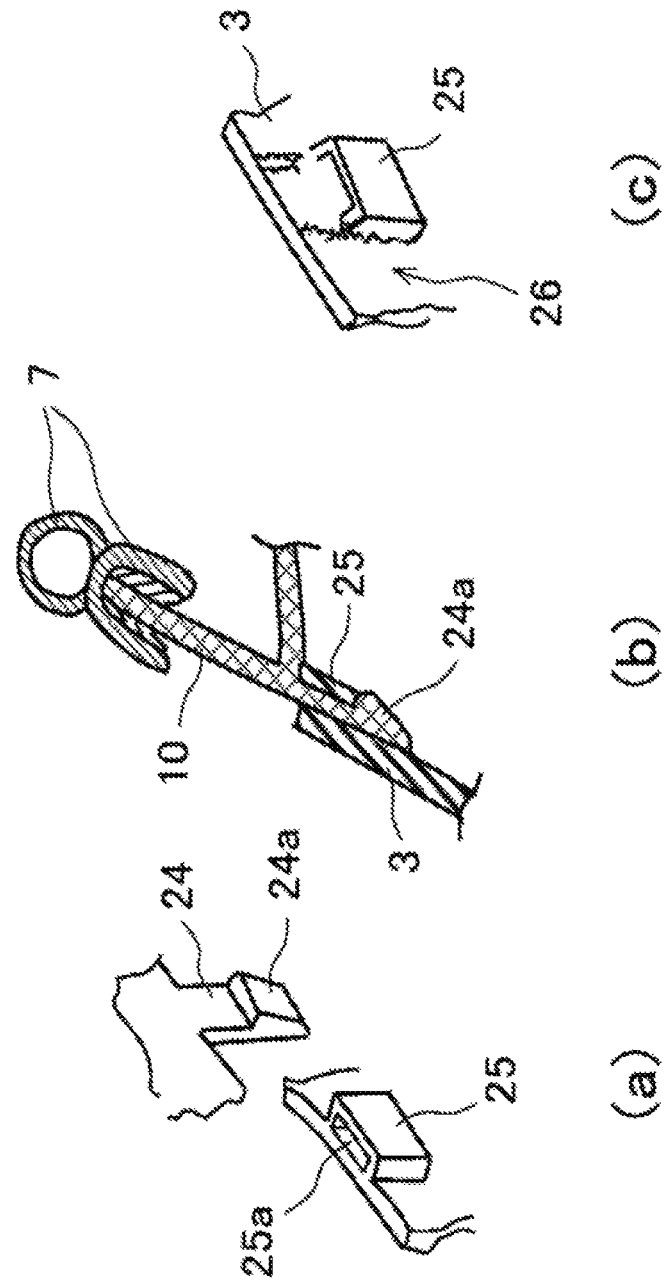
FIG. 10 (a) is a perspective view of essential parts between a first engaging portion and a second engaging portion, FIG. 10 (b) is a sectional view showing essential parts in an engaged state, and FIG. 10 (c) is a perspective view of essential parts, showing a broken state of an engaging-receiving portion (the third embodiment)

For example, as shown in FIG. 10 (a) and FIG. 10 (b), while a first engaging portion is constructed so as to be a fourth engaging claw 24 which is oriented downward at a tip end part of the upper cowl-top cover 2, a second engaging portion can also be constructed so as to be a fourth engaging-receiving portion 25 which is provided at an upper end part's side of the lower cowl-top cover 3. A fourth engaging-receiving portion 25 can be constructed so as to be provided on a face on the side of the front glass 6 on the upper end part's side of the lower cowl-top cover 3.

Of the fourth engaging claw 24, a hook 24a is formed at a lower end part, and in the fourth engaging-receiving portion 25, an engagement hole 25a penetrating in a vertical direction is formed. The fourth engaging claw 24 is inserted into the engagement hole 25a from an upper side while the hook 24a is elastically deformed, whereby the fourth engaging claw 24 can be engaged with the fourth engaging-receiving portion 25. The upper cowl-top cover 2 and the lower cowl-top cover 3 can be integrally bonded with each other.

In the case of such a construction as well, if the impact load acts on the hood 5 and/or the upper cowl-top cover 2, the supporting portion 10 can move downward along an interior side on the upper end part's side of the lower cowl-top cover 3, that is, along a face on the side of the front glass 6 on the upper end part's side of the lower cowl-top cover 3. With a downward movement of the supporting portion 10, as shown in FIG. 10 (c), the fourth engaging-receiving portion 25 breaks from a face on the upper end part's side of the lower cowl-top cover 3, and does not interfere with a downward movement of the upper cowl-top cover 2. This break portion is designated by reference numeral 26, and is illustrated in FIG. 10 (c).

[Fourth Embodiment]

With reference to FIG. 11 to FIG. 19, a construction of a fourth embodiment of the present invention will be described. Although in the second embodiment, there has been employed the construction in which the first engaging-receiving portion 12 serving as the first engaging portion is formed in the upper cowl-top cover 2, and the second engaging claw 15 serving as the second engaging portion is formed in the lower cowl-top cover 3, in the fourth embodiment, a supporting portion 10 is laid out and constructed so as to be inclined to a front side of a vehicle, and a construction of a respective one of a first engaging portion and a second engaging portion are different from a construction of the respective one of the first engaging portion and the second engaging portion.

Other constituent elements are similar to those in a respective one of the first embodiment and the second embodiment, like constituent elements are designated by like reference numerals, and a duplicate description is omitted. In addition, illustration of the vehicle body panel 4 configured to support and fix the connecting portion 9 of the lower cowl-top cover 3 (reference should be made to FIG. 2) is also omitted.

Figure 11:
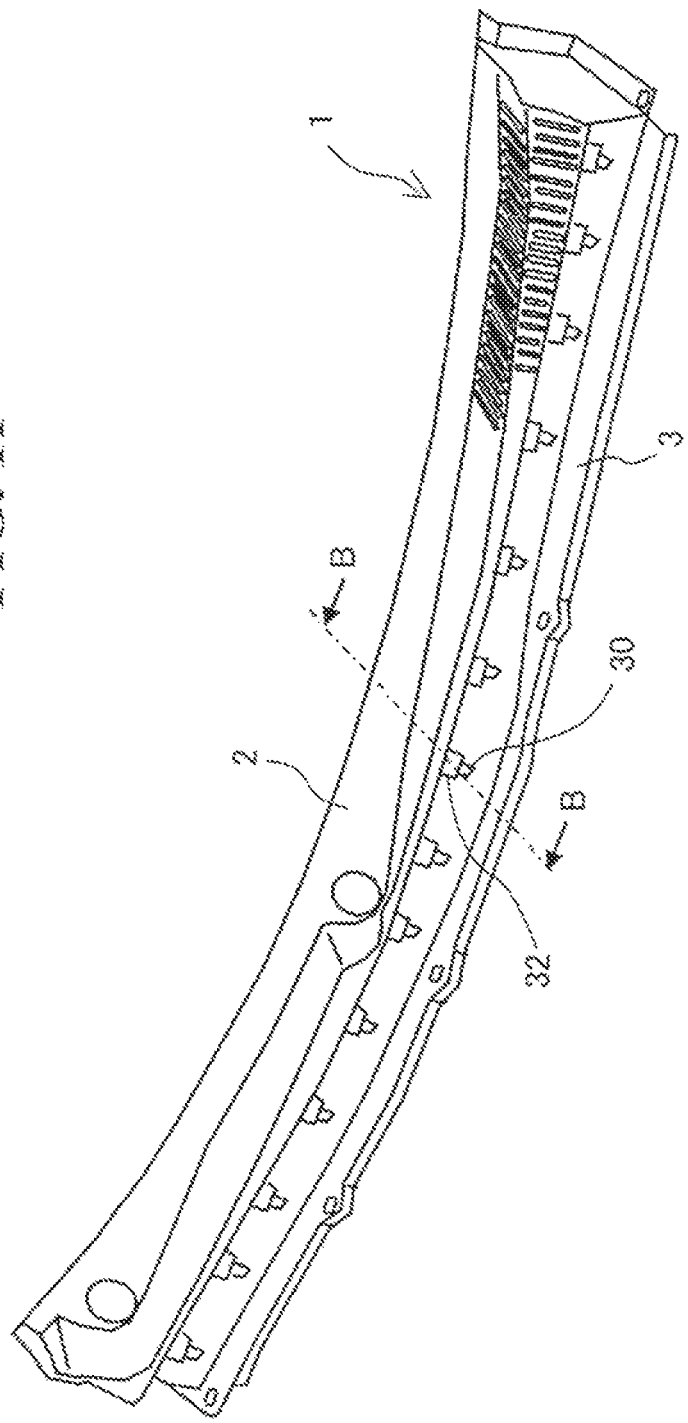
FIG. 11 is an entire view of another cowl-top cover (a fourth embodiment)

FIG. 11 shows a perspective view of a cowl-top cover 1 according to the fourth embodiment, and an upper cowl-top cover 2 and a lower cowl-top cover 3 are integrated with each other by way of engagement between a fifth engaging claw 30 serving as a first engaging portion and a fifth engaging-receiving portion 32 serving as a second engaging portion. As shown in FIG. 11, the fifth engaging claw 30 and the fifth engaging-receiving portion 32 are arranged in plurality at substantially equal intervals along a widthwise direction of the cowl-top cover 1.

Figure 12:
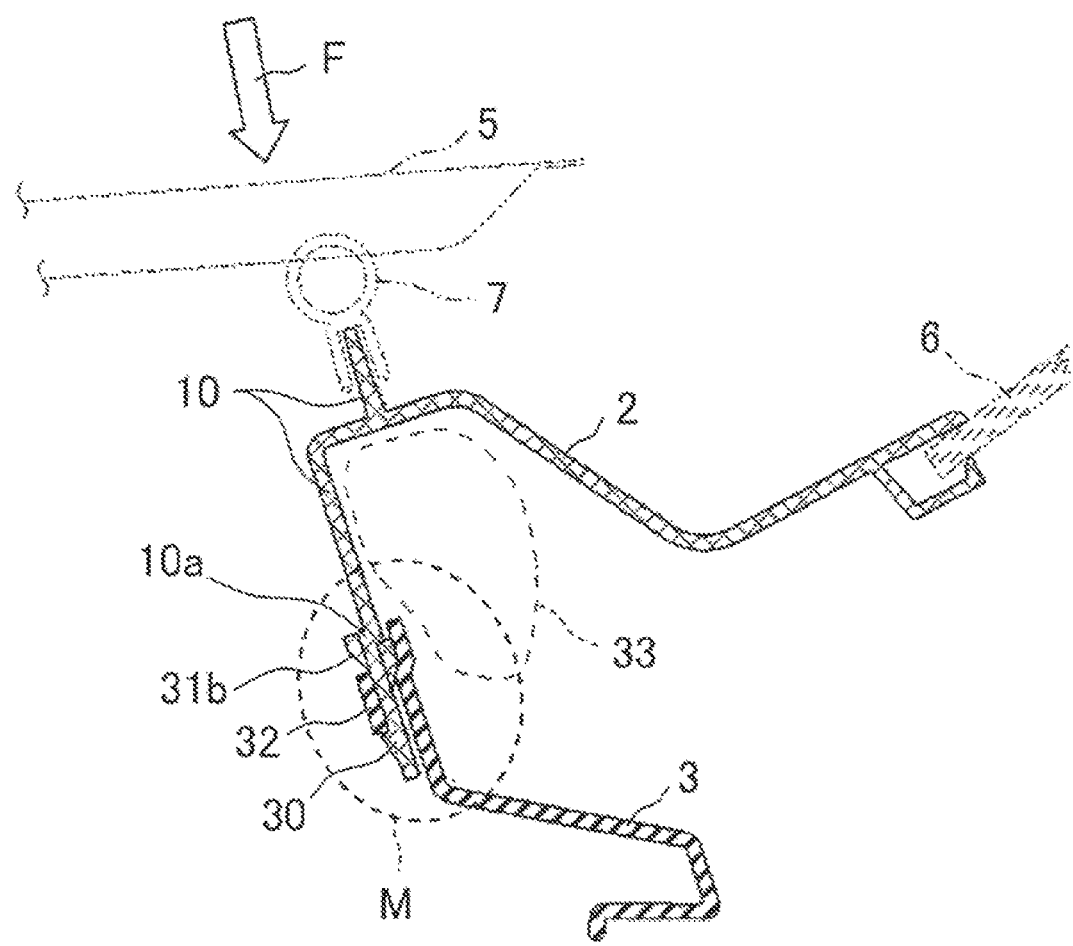
FIG. 12 is a sectional view taken along the line A-A of FIG. 1, and is also a sectional view taken along the line B-B of FIG. 11 when the cowl-top cover of FIG. 11 is employed (the fourth embodiment)

FIG. 12 shows a sectional view taken along the line A-A of FIG. 1 when the cowl-top cover 1 shown in FIG. 11 is mounted in the vehicle shown in FIG. 1, and also shows a cross section of a site shown to a cross section taken along the line B-B of FIG. 11 when it is seen with respect to the cowl-top cover 1. In FIG. 12, a region on an upper side surrounded by the dotted line indicates a permissible stroke space 33 in which an upper cowl-top cover 2 can be lowered without any deformation occurring with a lower cowl-top cover 3 when an impact load acts thereon. A region on the lower side surrounded by the dotted line indicated a location of an enlarged region M which is shown in an enlarged manner in FIG. 13.

Figure 13:
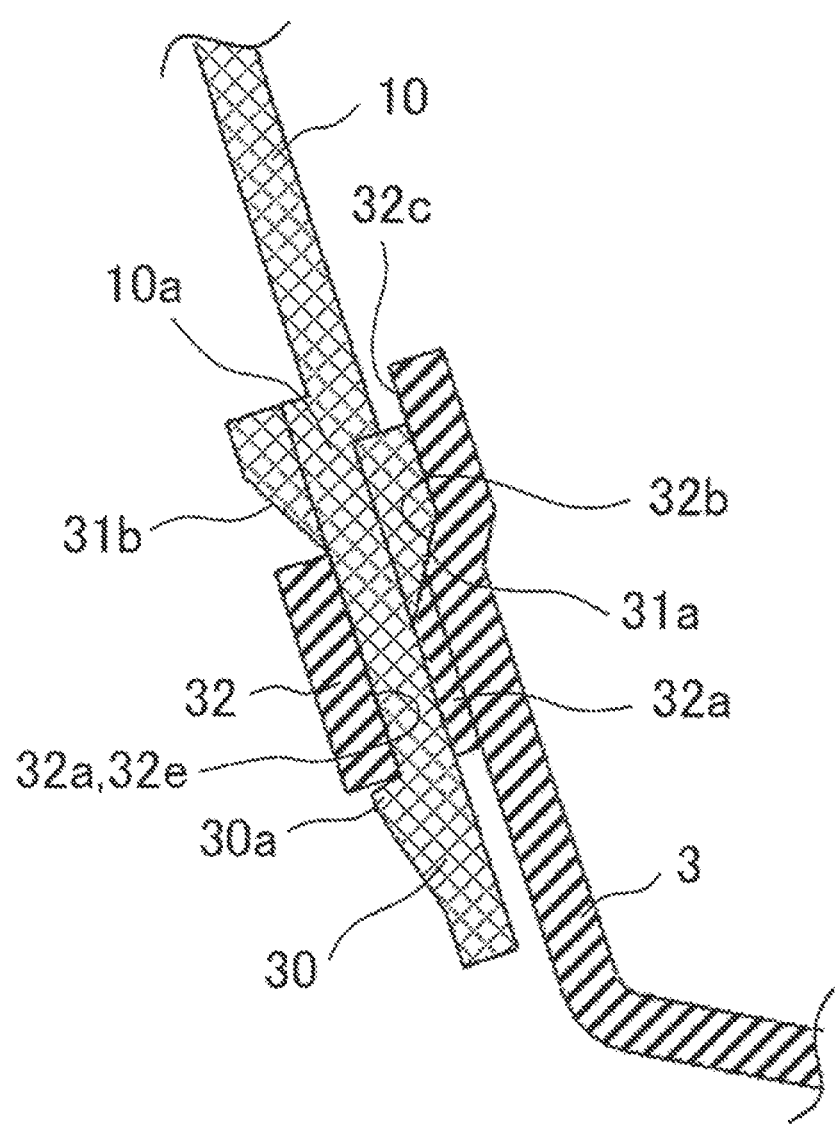
FIG. 13 is an enlarged view of a portion surrounded by M of FIG. 12 (the fourth embodiment)

As shown in FIG. 12 to FIG. 14, at the other end part 10a of a supporting portion 10, a fifth engaging claw 30 serving as a first engaging portion is formed, and at a lower end part thereof, a hook 30a is formed. In three directions, i.e., on the left and right and lower sides of the hook 30a, slips 30b are formed, enabling the hook 30a to be elastically deformed in a forward and backward direction. In addition, on both side faces in the forward and backward direction of the fifth engaging claw 30, inclined faces 31a, 31b which are inclined downward are respectively formed.

In the fifth engaging-receiving portion 32 into which the fifth engaging claw 30 is to be inserted, an engagement hole 32a penetrating in a vertical direction is formed, and a widthwise dimension in a forward and backward direction of the engagement hole 32a, that is, intervals in a transverse direction of the engagement bole 32a in FIG. 13 are formed so as to be larger than a plate thickness of the supporting portion 10. By forming the widthwise dimension of the engagement hole 32a so as to be larger, insertion of the hook 30a is facilitated when the hook 30a of the fifth engaging claw 30 is inserted into the engagement hole 32a. In addition, when the supporting portion 10 is moved downward by an impact load, the inclined fanes 31a, 31b easily get into the engagement hole 32a.

The upper cowl-top cover 2 can be lowered so as to absorb the impact load. Moreover, by the permissible stroke 33, the upper cowl-top cover 2 can be lowered without colliding with the lower cowl-top cover 3 while it is guided to a face on an upper end part's side of the lower cowl-top cover 3.

As shown in FIG. 14 (c), in an insertion opening portion of the fifth engaging-receiving portion 32, an inclined face 32b coming into facial contact with an inclined face 31a is formed, and a recessed portion 32c for receiving the inclined face 31a is formed on an upper side of the insertion opening portion. By forming the inclined face 32b, in a state in which the fifth engaging claw 30 that is provided at the supporting portion 10 is inserted into the engagement hole 32a and then the hook 30a is engaged with a lower end face of the engagement hole 32a, the supporting portion 10 can be spaced from a face on the upper end part's side of the lower cowl-top cover 3. A face on a front side of the supporting portion 10 can be abutted against the side of a reception face 32e of the fifth engaging-receiving portion 32 forming the engagement hole 32a. In this manner, a state in which the fifth engaging claw 30 and the fifth engaging-receiving portion 32 are engaged with each other can be reliably maintained.

In addition, the inclined face 32b can function as a guide configured to guide the supporting portion 10 to a lower side when the supporting portion 10 is downwardly lowered by the impact load.

Although in FIG. 12, a site of the supporting portion 10 mounting a sealing member 7 and a site of the supporting portion 10 forming the fifth engaging claw 30 are laid out and constructed in an L-crank shape, the site of the supporting portion 10 mounting the sealing member 7 and the site of the supporting portion 10 forming the fifth engaging claw 30 can be laid out and constructed in a linear shape. Also, even if the supporting portion 10 is laid out and constructed in the L-crank shape as mentioned above, in a case where an impact load acts on the supporting portion 10 via the sealing member 7, a shearing force and a bending moment act on the fifth engaging claw 30 at the same time, and shearing of the fifth engaging-receiving portion 32 can be carried out more reliably and within a short period of time.

In addition, a rigidity obtained when the upper cowl-top cover 2 and the lower cowl-top cover 3 are integrated with each other can be improved, and a well-fitting cowl-top cover 1 can be obtained. Moreover, because of an insertion construction in one direction exerted by claw engagement, the assembling work of the cowl-top cover 1 is facilitated, and the working hour required for assembling is reduced. Furthermore, the cowl-top cover 1 with an appropriate rigidity thereof can be manufactured without a need to employ special equipment such as a welding machine.

Figure 15:
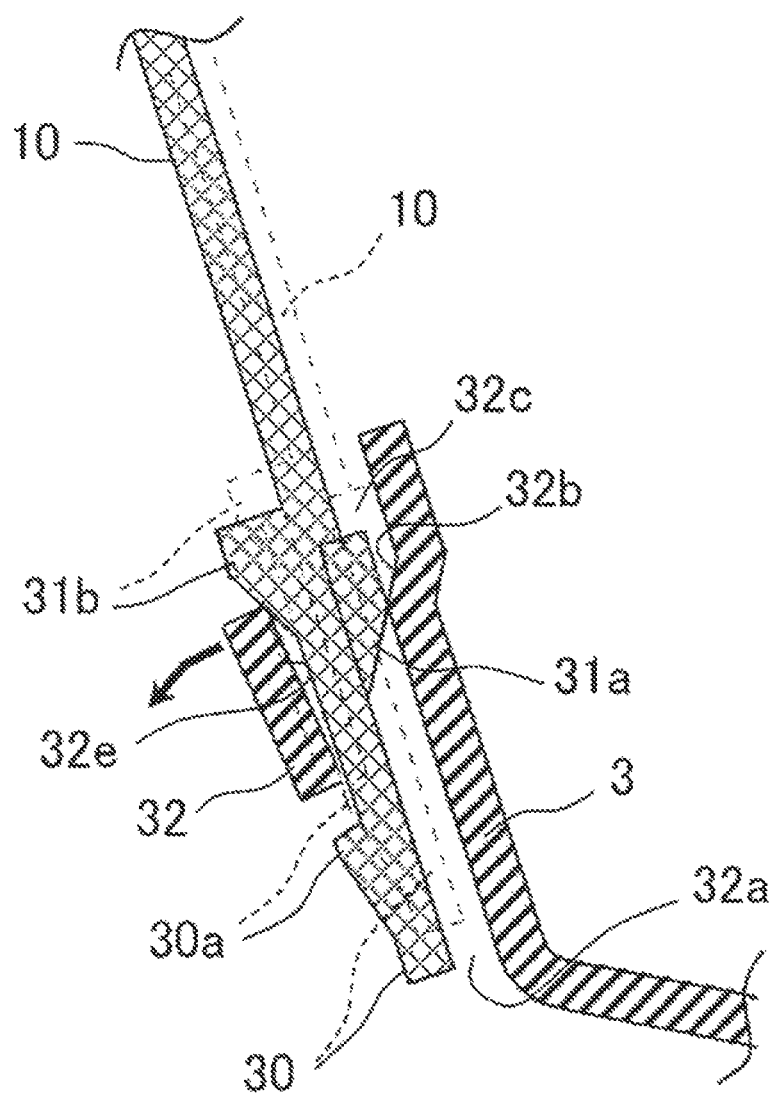
FIG. 15 is an illustrative view showing an operational state at the time of input of an impact (the fourth embodiment)
Figure 16:
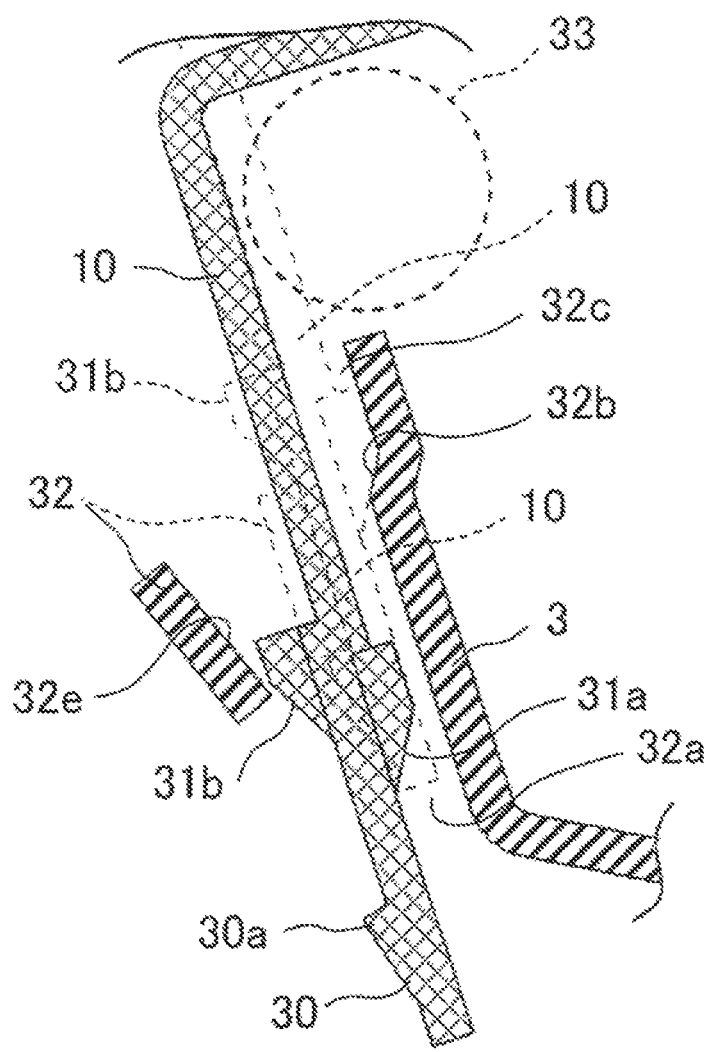
FIG. 16 is an illustrative view showing a state after impact absorption in cross section (the fourth embodiment)

Next, with reference to FIG. 15 and FIG. 16, a description will be given with respect to a circumstance in which the fifth engaging-receiving portion 32 breaks when an impact load acts on the supporting portion 10. FIG. 15 and FIG. 16 show, by the dotted line, a state before the impact load acts on the supporting portion 10, and also show, by the solid line, a state in which the impact load acts on the supporting portion 10 and then the supporting portion 10 moves downward, respectively FIG. 15 shows an initial state in which the impact load acts on the supporting portion 10, and FIG. 16 shows a circumstance in which the supporting portion 10 lowers to a state in which the fifth engaging-receiving portion 32 completely breaks, respectively.

As shown in FIG. 15, if an impact load acting on the hood 5 and/or the upper cowl-top cover 2 is transmitted to the supporting portion 10, the supporting portion 10 moves from the state indicated by the dotted line to the state indicated by the solid line. That is, the inclined face 31a lowers while slipping on the inclined face 32b on the side of the fifth engaging-receiving portion 32. At this time, by a wedging action exerted by the inclined faces 31a, 31b, an insertion opening portion of the engagement hole 32a of the fifth engaging-receiving portion 32 is widened, and the fifth engaging-receiving portion 32 is broken.

As shown in FIG. 16, the fifth engaging-receiving portion 32 can be completely broken. Moreover, the upper cowl-top cover 2 is capable of moving downward without abutting against the lower cowl-top cover 3 while moving in a region of the permissible stroke space 33, and is also capable of absorbing the impact load by a downward movement of the upper cowl-top cover 2.

In addition, when the impact load is transmitted to the supporting portion 10, the supporting portion 10 is laid out and constructed so as to be inclined to a front side, and thus, the impact load acting on the supporting portion 10 can be concentrated on the side of the reception face 32e of the fifth engaging-receiving portion 32, and shearing of the fifth engaging-receiving portion 32 can be carried out more reliably and easily Thus, a downward movement of the upper cowl-top cover 2 can be smoothly carried out, and the energy of the impact load can be efficiently absorbed, and therefore, for example, a resistance force acting in the obstacle 20 rolling on the hood 5 can be lowered, and a protection performance with respect to the obstacle 20 can be improved.

Figure 17:
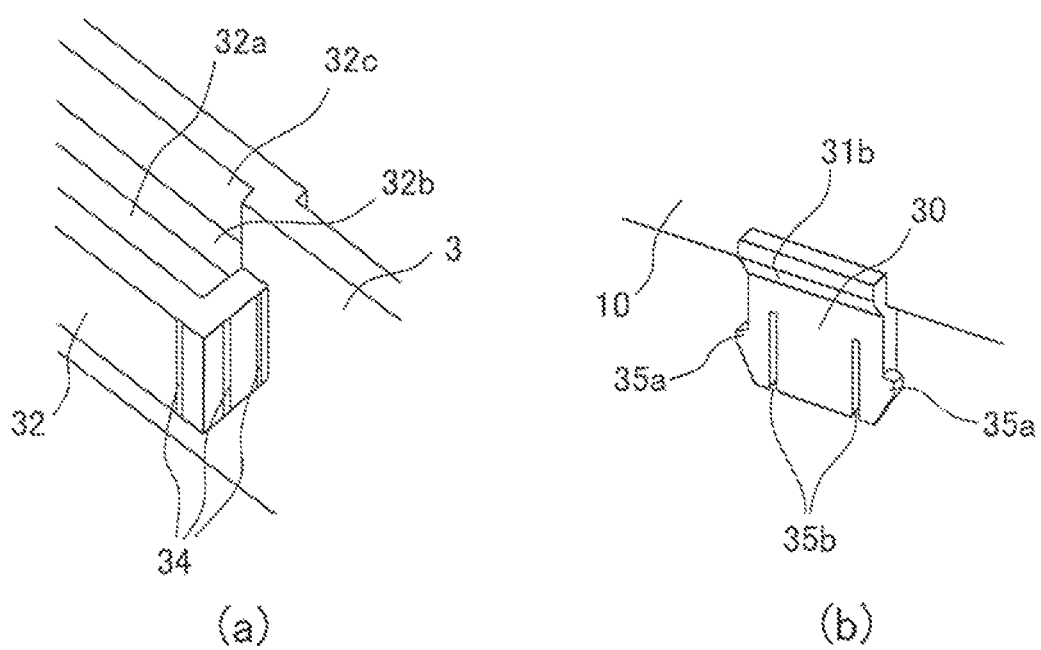
FIG. 17 (a) is a perspective view of essential parts of an engaging-receiving portion in another construction, and FIG. 17 (b) is a perspective view of essential parts of an engaging claw in another construction (the fourth embodiment)

As shown in FIG. 17 (b), as a construction of the fifth engaging claw 30, a hook 35a can be constructed so as to protrude in a widthwise direction of the fifth engaging claw 30, that is, in a transverse direction of FIG. 17 (b). In this case, in order to easily insert the fifth engaging claw 30 into the engagement hole 32a, there can be employed a construction in which a slit 35b is formed on a back face side of the hook 35a, and an elastic deformation easily takes place with the hook 35a.

When the supporting portion 10 advances into the engagement hole 32a by the impact load, a vulnerable part 34 can be formed in the fifth engaging-receiving portion 32 as shown in FIG. 17 (a) in order to easily produce a breakage of the fifth engaging-receiving portion 32. As a shape of the vulnerable part 34, at least one or more vulnerable parts shaped like longitudinally elongated cut grooves can be formed so as to be in a vertical direction which is identical to a direction in which the engagement hole 32a is formed. The vulnerable part 34 is formed in the shape of the longitudinally elongated cut groove, whereby breakage of the fifth engaging-receiving portion 32 can be easily carried out. It is to be noted, in the fifth engaging-receiving portion 32 shown in FIG. 14 (c) as well, a vulnerable part can also be formed on a side face or the like thereof.

Figure 18:
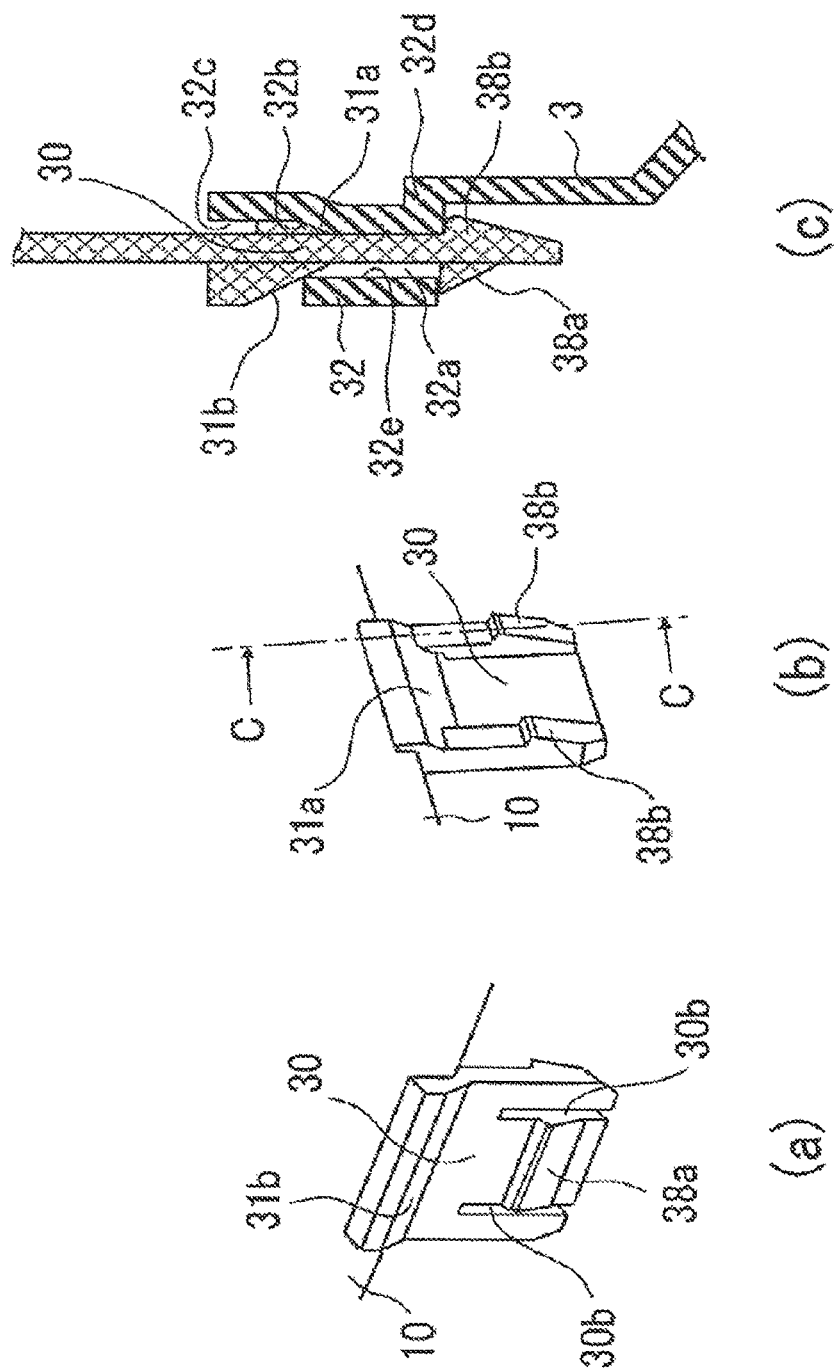
FIG. 18 (a) is a perspective view of essential parts of an engaging claw in another construction.

In addition, as shown in FIG. 18 (a) to FIG. 18 (c), hooks 38a, 38b in the fifth engaging claw 30 can also be formed so as to respectively protrude from a respective one of front and rear faces of the fifth engaging claw 30. In order for the hook 38a that protrudes from the fifth engaging claw 30 to the front side and the hook 38b that protrudes to the rear side to easily produce an elastic deformation respectively independently, a slit 30b can be formed between the hook 38a and the hook 38b. At an upper side of the hook 38a, an inclined face 31b can be formed, and at an upper side of the hook 38b, an inclined face 31a can be formed.

The fifth engaging claw 30 is thus formed, whereby, if the fifth engaging claw 30 is inserted into the engagement hole 32a, as shown in FIG. 18 (c), the hook 38a and the hook 38b can be engaged with each other with respect to a lower end face of the engagement hole 32a. In order to engage the hook 38b, a stepped portion 32d can be formed at a lower end part of the engagement hole 32a.

In the foregoing descriptive matters, a description has been given with respect to a construction in which the fifth engaging claw 30 is formed downward at the tip end part of the upper cowl-top cover 2, that is, at the lower end part of the supporting portion 10, and the fifth engaging-receiving portion 32 is formed on the front face side on the upper end part's side of the lower cowl-top cover 3. The construction according to the fourth embodiment is not limited to the construction described above, and as shown in FIG. 19 (a), there can be employed a construction in which the fifth engaging-receiving portion 32 is formed on a face on a rear side on the upper end part's side of the lower cowl-top cover 3.

Figure 19:
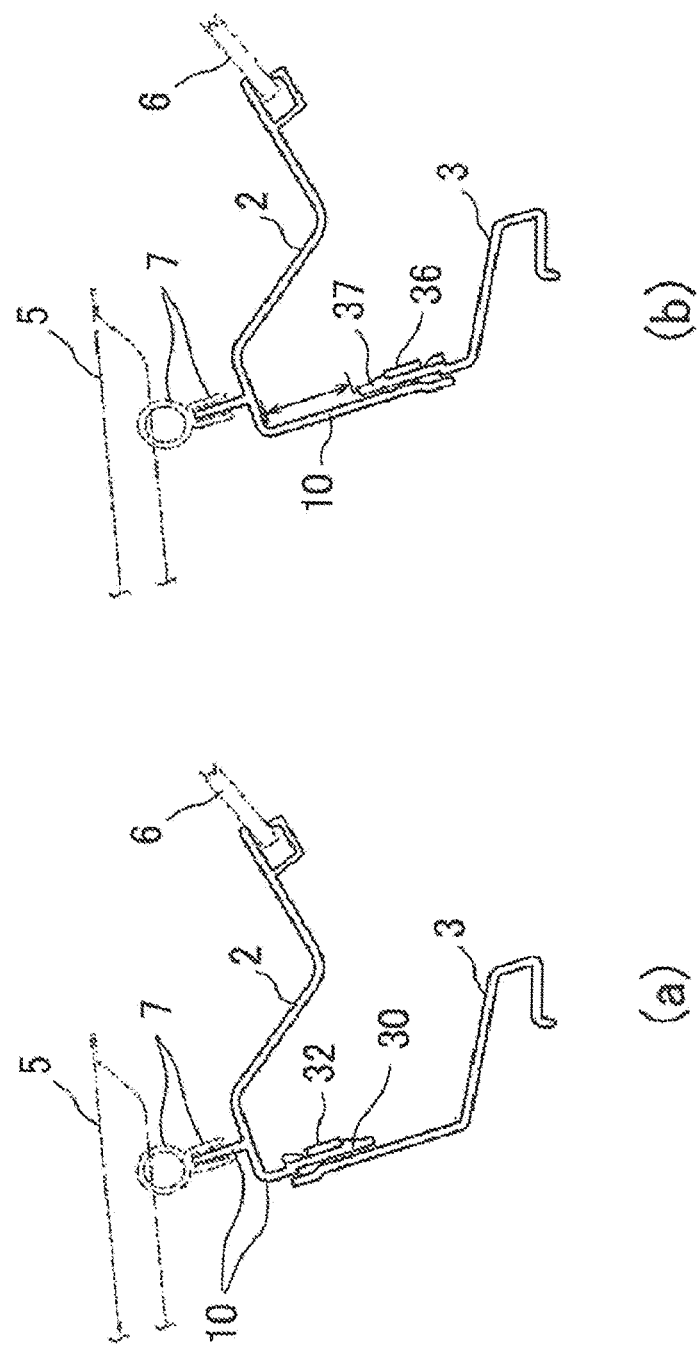
FIG. 19 (a) is a sectional view of essential parts showing a state in which an engaging-receiving portion and an engaging claw are engaged with each other, and FIG. 19 (b) is a sectional view of essential parts showing another engaged state (the fourth embodiment)

In addition, as shown in FIG. 19 (b), while a sixth engaging-receiving portion 36 is formed as a first engaging portion at a front part of the upper cowl-top cover 2, that is, at a lower end part of the supporting portion 10, a sixth engaging claw 37 configured to be inserted into an engagement hole which is formed in the sixth engaging-receiving portion 36 can also be formed as a second engaging portion on the upper end part's side of the lower cowl-top cover 3.

In the construction shown in FIG. 19 (*b*), in a case where an impact load acts on the supporting portion 10 and then a downward force acts thereon, the upper cowl-top cover 2 does not abut against an upper end part of the lower cowl-top cover 3 in the middle of a downward movement of the upper cowl-top cover 2. Thus, even if the permissible stroke space 33 as shown in FIG. 12 is not formed in particular, a downward lowering of the upper cowl-top cover 2 is not interfered until a tip end of the fifth engaging claw 30 has abutted against the lower cowl-top cover main body 3*a* (reference should be made to FIG. 2).

It is to be noted that, after the tip end of the fifth engaging claw 30 has abutted against the lower cowl-top cover main body 3*a* (reference should be made to FIG. 2), as has been described in the first embodiment, the lower cowl-top cover 3 can be turned. Lowering of the upper cowl-top cover 2 can be further carried out.

In the construction shown in FIG. 19 (*b*), while the sixth engaging-receiving portion 36 is formed on a face on a rear side in the supporting portion 10, the sixth engaging claw 37 can be inserted into an engagement hole of the sixth engaging-receiving portion 36 from a lower side to an upper side. In the case of this construction, at the time of a downward movement of the upper cowl-top cover 2, there is a need to form the permissible stroke space 33 as shown in FIG. 12 at an upper part of the sixth engaging claw 37 in order to save the number of strokes until the upper cowl-top cover 2 has abutted against the sixth engaging claw 37 that is provided in the lower cowl-top cover 3.

In FIG. 19 (*b*), in a case where the sixth engaging-receiving portion 36 is constructed so as to be provided on a front face on the other end part's side of the supporting portion 10, there is a need to construct a lengthwise dimension of an upper end part of the lower cowl-top cover 3 so as to be long, as shown in FIG. 19 (*a*). By employing such a construction, a downward lowering of the upper cowl-top cover 2 is not interfered until the other end part of the supporting portion 10 has abutted against the lower cowl-top cover main body 3*a* (reference should be made to FIG. 2).

[Fifth Embodiment]

With reference to FIG. 20 to FIG. 24, a construction of a fifth embodiment of the present invention will be described. In the first to fourth embodiments, the upper cowl-top cover 2 and the lower cowl-top cover 2 are integrally coupled to each other by way of engagement between the first engaging portion and the second engaging portion, whereby the cowl-top cover 1 is constructed. Although in the fifth embodiment, a basic structure is identical to the above described constructions in the first to fourth embodiments, a space which is formed by the upper cowl-top cover 2 and the lower cowl-top cover 3 is further constructed as a noise interruption space R.

Other constituent elements are similar to those in the first to fourth embodiments, like constituent elements are designated by like reference numerals, and a duplicate description is omitted. In FIG. 20 to FIG. 24, while the construction shown in the third embodiment is employed as a construction of the cowl-top cover, in addition to the construction shown in the third embodiment, its related construction can also be employed as the constructions shown in the first, second, and fourth embodiments.

Figure 20:
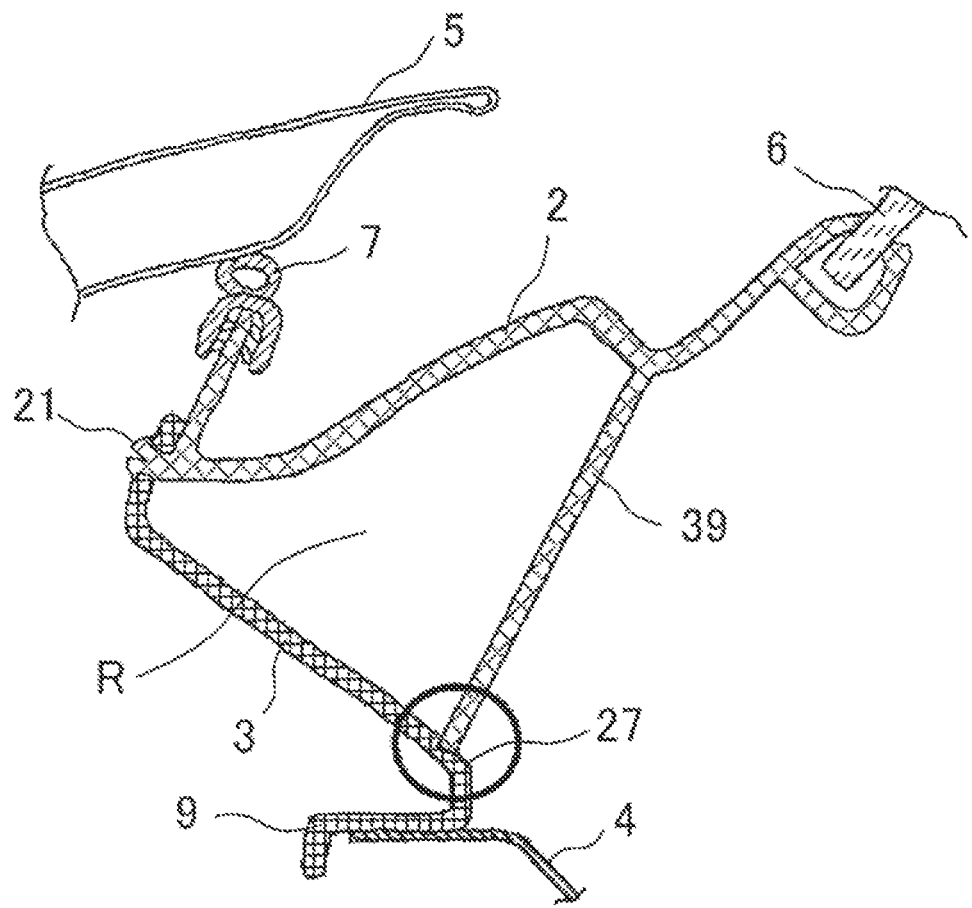
FIG. 20 is a sectional view taken along the line A-A of FIG. 1 (a fifth embodiment)

As shown in FIG. 20, a noise interruption wall 39, which is provided so as to extend from the upper cowl-top cover 2 to the side of the lower cowl-top cover 3, is formed. A lower end part of the noise interruption wall 39 is constructed so as to be engaged with a stepped portion 27, which is formed in proximity to a bent portion on the side of a connecting portion 9 to a vehicle body panel 4 of the lower cowl-top cover 3.

A region, which is surrounded by the upper cowl-top cover 2, the lower cowl-top cover 3, and the noise interruption wall 39, is constructed as a noise interruption space R. By forming the noise interruption space R, propagation into a vehicle chamber of an engine noise or the like which is generated in an engine room can be reduced.

Figure 21:
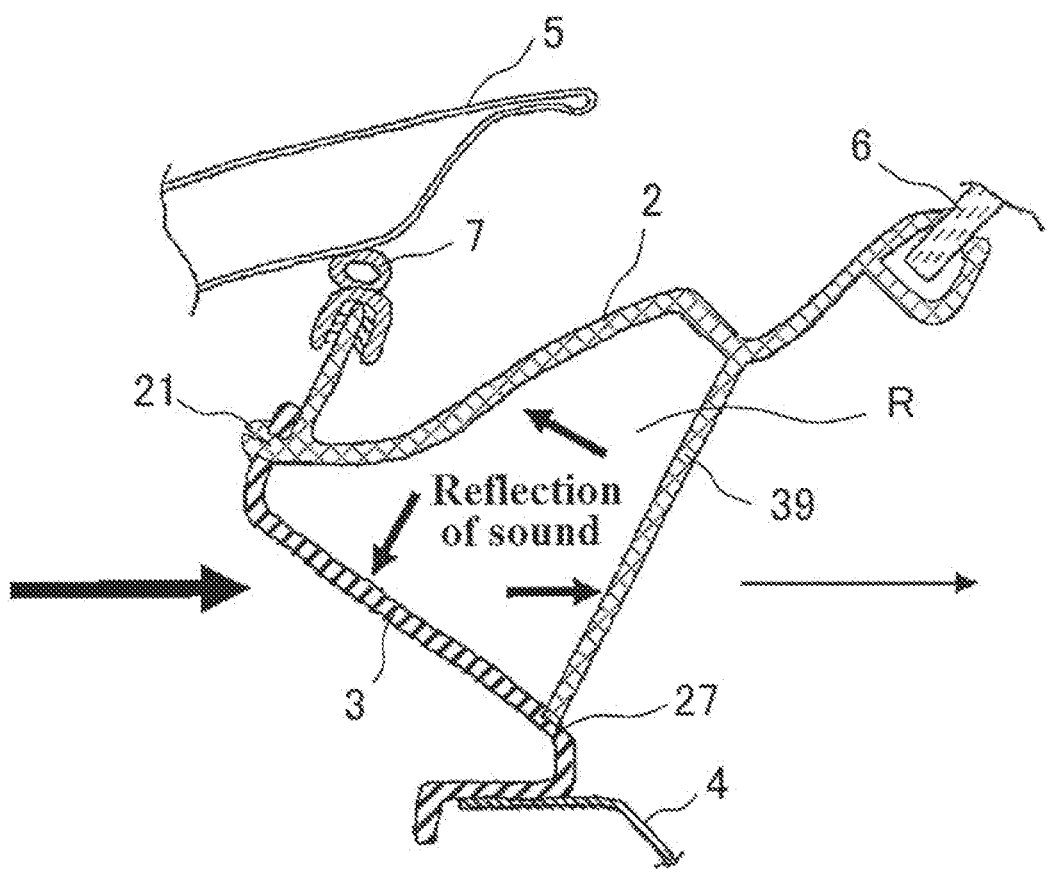
FIG. 21 is a sectional view of essential parts showing a noise propagation state (the fifth embodiment)

As shown in FIG. 21, although the noise that is generated in the engine room propagates into the vehicle chamber as indicated by the arrow with a large width thereof, if the generated noise enters the noise interruption space R, the resultant noise is echoed by the upper cowl-top cover 2, the lower cowl-top cover 3, and the noise interruption wall 39 that constitute the noise interruption space R, and then, the thus echoed noise attenuates. As a result, the noise that is propagated from the noise interruption space R into the vehicle chamber propagates in a state in which the noise is attenuated as indicated by the arrow with a small width thereof, and the noise can be remarkably reduced. In addition, the quietness in the vehicle chamber can be significantly improved.

Further, because of a construction configured to merely form the noise interruption wall 39, there is no need to additionally provide a noise absorption material as described in Japanese Unexamined Patent Application Publication No. 2007-106366 mentioned above, an increase in working hour of assembling work for manufacturing the cowl-top cover or an increase in number of parts can be reduced, and higher manufacturing costs does not take place. Furthermore, a lower end part of the noise interruption wall 39 is slid along the stepped portion 27 that is formed in the lower cowl-top cover 3, whereby the noise interruption wall 39 can be engaged with the lower cowl-top cover 3.

If a downward impact load is applied to the hood 5 and/or the upper cowl-top cover 2, a downward compression force acts on the upper cowl-top cover 2 and then the upper cowl-top cover 2 moves downward. At this time, the lower end part of the noise interruption wall 39 and the lower cowl-top cover 3 are disengaged from each other, a downward movement of the upper cowl-top cover 2 further advances.

As has been described in the first to fourth embodiments, the first engaging portion and the second engaging portion are disengaged from each other and then the lower end part of the noise interruption wall 39 is easily removed from the stepped portion 27 of the lower cowl-top cover 3. In this manner, stretching exerted by the noise interruption wall 39 does not take place and thus a downward movement of the upper cowl-top cover 2, that is, a downward movement of the supporting portion 10 is not interfered.

The stepped portion 27 is formed so as to easily engage the lower end part of the noise interruption wall 39 therewith, and is constructed so as to easily disengage the lower end part therefrom if an impact load acts on the upper cowl-top cover 2. For example, the stepped portion 27 can be formed in the shape of a tapered face so as to be high on the side of the hood 5 and so as to be low on the side of the front glass 6.

Figure 22:
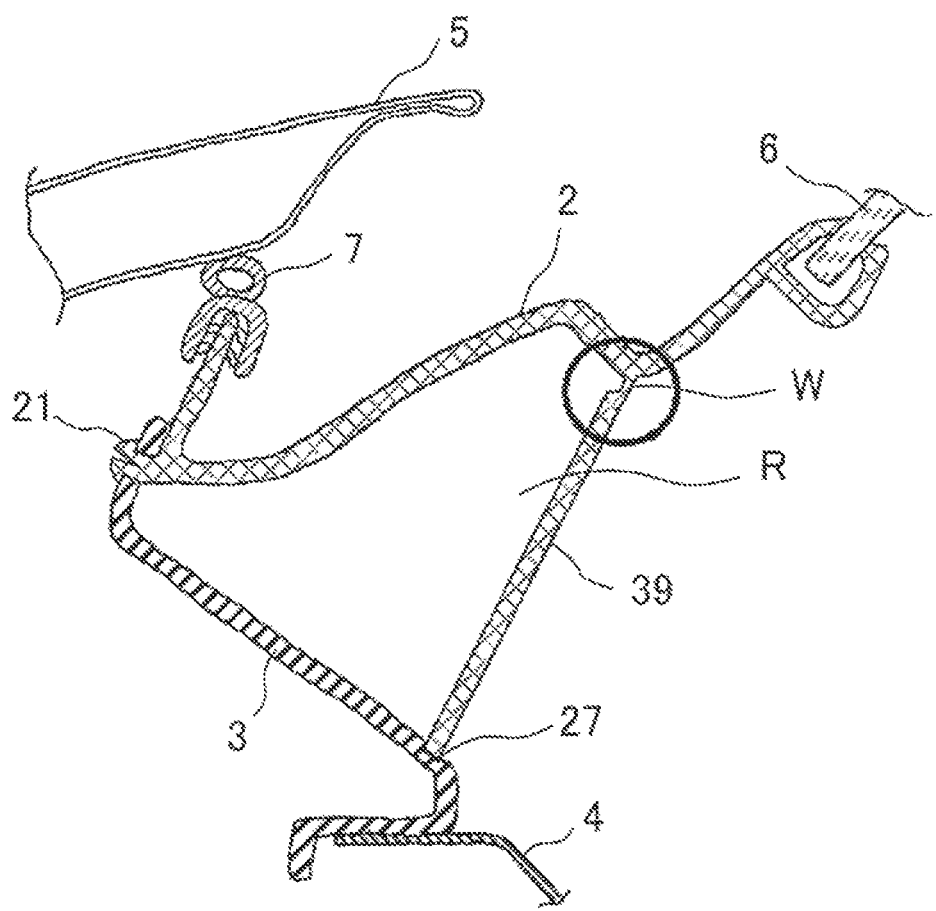
FIG. 22 is a sectional view of essential parts, showing a constriction of a noise interruption wall between an upper cowl-top cover and a lower cowl-top cover (the fifth embodiment)

In addition, as a construction of the noise interruption wall 39, as shown in FIG. 22, at a junction portion with the upper cowl-top cover 2, a vulnerable part W can also be formed as a site which is surrounded by the circle, that is, a thin portion can also be formed as the vulnerable part W. By forming the vulnerable part W, when the upper cowl-top cover 2 is moved downward by an impact load, the noise interruption wall 39 can be broken around the vulnerable part W. A site of the noise interruption wall 39 configured to form the vulnerable part W can also be formed at an intermediate part of the noise interruption wall 39 in addition to the proximity to the junction portion with the upper cowl-top cover 2.

Figure 23:
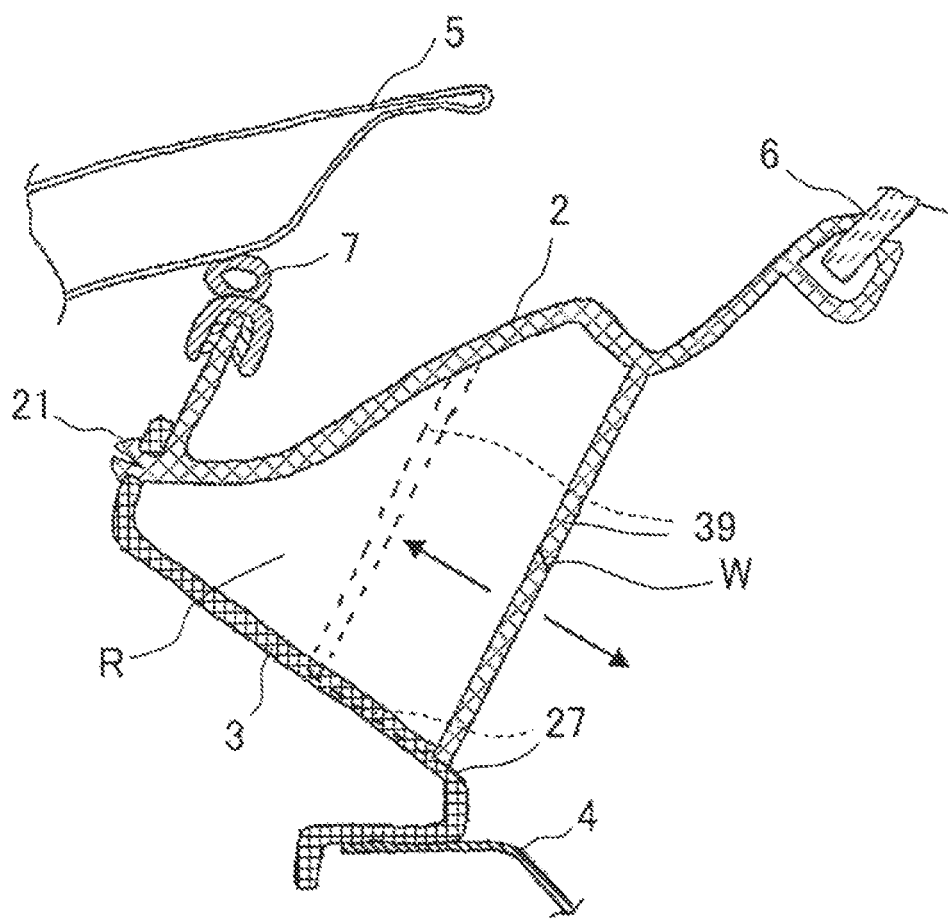
FIG. 23 is a sectional view of essential parts, showing a layout and construction of the noise interruption wall (the fifth embodiment)

In a case where the vulnerable part W is formed at the intermediate part, the vulnerable part can also be formed in a thin shape, or alternatively can be formed as an oblique cut as shown in FIG. 23. The vulnerable part W is formed as the oblique cut as mentioned above, whereby, when the upper cowl-top cover 2 is moved downward by the impact load, the noise interruption wall 39 is divided into two sections in a vertical direction by way of this oblique cut.

As shown in FIG. 23, the noise interruption wall 39 can also be arranged at a frontal position. By arranging the noise interruption wall 39 at the frontal position, the size of the noise interruption space R can be adjusted to an optimal size such that noise from the engine room can be easily absorbed, and a noise absorption effect can be enhanced.

Even in a case where the noise interruption wall 39 s arranged at a position at which the wall is moved to the front side, the stepped portion 27 engaging the lower end part of the noise interruption wall 39 therewith can be provided so as to extend up to a position at which the lower end part of the noise interruption wall 39 is arranged, as indicated by the dotted line. Moreover, a face abutting against the lower end part of the noise interruption wall 39 in the stepped portion 27 can be formed in the shape of a tapered face, and thus, when the upper cowl-top cover 2 and the lower cowl-top cover 3 are engaged with each other, the noise interruption wall 39 can be easily slid along the top of the stepped portion 27.

Figure 24:
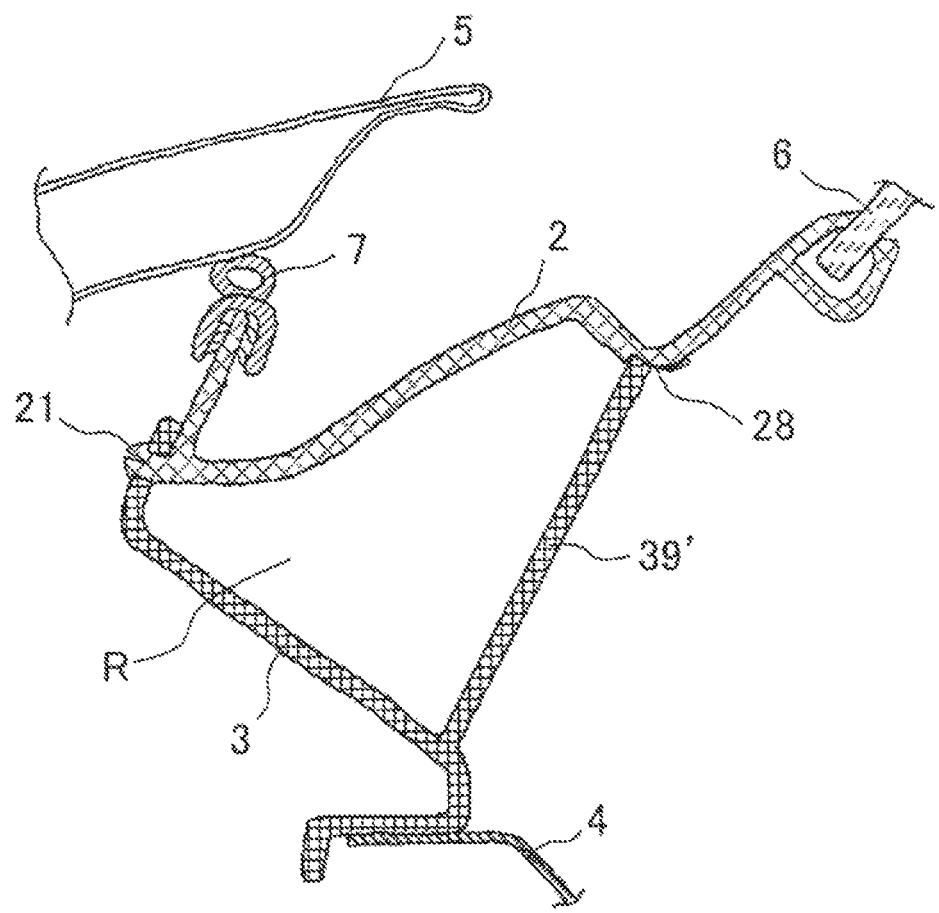
FIG. 24 is a sectional view of essential parts, showing another layout and construction of the noise interruption wall (the fifth embodiment)
Figure 25:
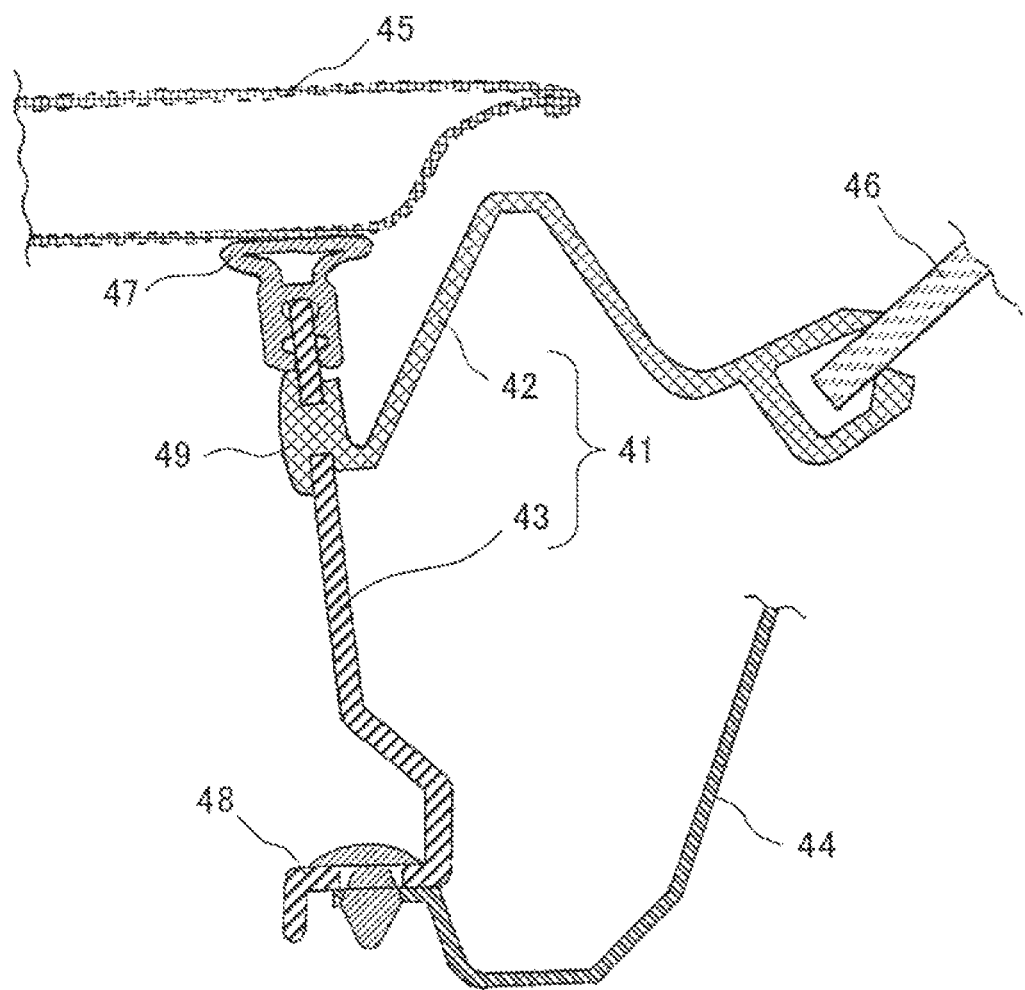
FIG. 25 is a sectional view taken along the line A-A in FIG. 1 of a cowl-top cover (related art 1)
Figure 26:
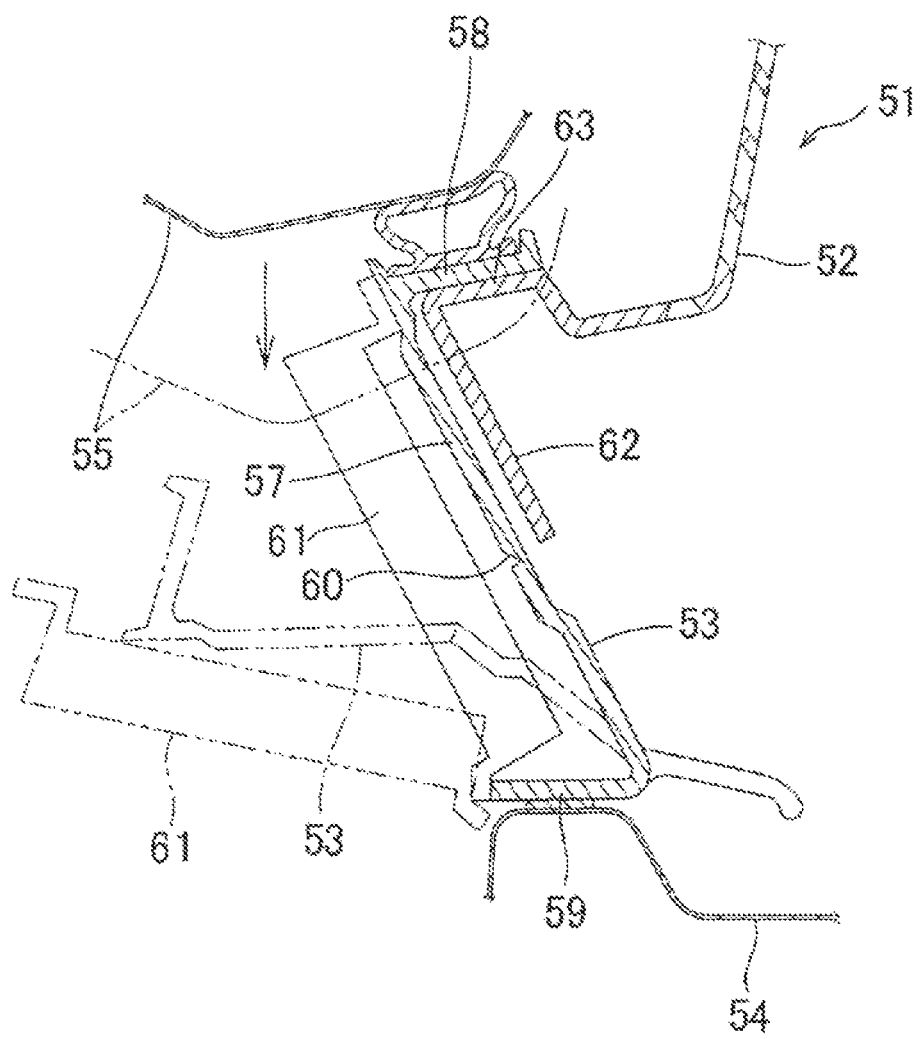
FIG. 26 is a sectional view of proximity of a cowl grill front part (related art 2).

As shown in FIG. 24, a noise interruption wall 39' can also be constructed so as to be erected from the side of the lower cowl-top cover 3. With this construction, an upper end of the noise interruption wall 39' is formed so as to engage with the stepped portion 28 that is formed on a lower face of a bent portion of the upper cowl-top cover 2. A vulnerable part W can also be formed at a lower end side or at a center part of the noise interruption wall 39'. In addition, a face of the stepped portion 28, with which an upper end part of the noise interruption wall 39' abuts, can be formed as a tapered face.

By employing such a construction, stretching of the noise interruption walls 39, 39' can be prevented when an impact load acts on the upper cowl-top cover 2. In addition, although at the time of normal operation, the cowl-top cover 1 is formed in a shape which is easily deformable due to a thermal effect or the like, the noise interruption walls 39, 39' are provided, whereby a support between the upper cowl-top cover 2 and the lower cowl-top cover 3 is obtained, and deformation of the cowl-top cover 1 can be prevented.

Although in the constructions of the first to fifth embodiments, a description has been given with respect to a construction in which the cowl-top cover 1 is divided into two sections, i.e., the upper cowl-top cover 2 and the lower cowl-top cover 3, the present invention is not limited to this construction. For example, the upper cowl-top cover 2 can also be constructed so as to be further divided into two sections, i.e., an upper cowl-top cover main body 2a and a supporting portion 10. In addition, the lower cowl-top cover 3 can also be constructed so as to be divided into two sections, i.e., a lower cowl-top cover main body 3a and a connecting portion 9. Thus, a construction in which the cowl-top cover 1 is multiply divided into three or more sections is also encompassed in the present invention.

INDUSTRIAL APPLICABILITY

The present invention can be applied to a cowl-top cover.

What is claimed is:

1. A divisional cowl-top cover, comprising:
an upper cowl-top cover; and
a lower cowl-top cover,
the divisional cowl-top cover being disposed among a lower end part of a front glass of a motor vehicle, a rear end part of a hood, and an upper end part of a vehicle body panel,
wherein the upper cowl-top cover has an upper cowl-top cover main body and a first engaging portion which is positioned at a lower side of the hood, and which is provided in front of the upper cowl-top cover main body,
the lower cowl-top cover has a lower cowl-top cover main body which is positioned so as to be lower than the upper cowl-top cover and a second engaging portion which is formed at an upper end of the lower cowl-top cover main body, and which engages with the first engaging portion,
the upper cowl-top cover and the lower cowl-top cover are coupled to each other by way of an engagement between the first engaging portion and the second engaging portion, wherein the first engaging portion and the second engaging portion are constructed by employing an engaging-receiving portion having an engagement hole penetrating in a substantially vertical direction and an engaging claw engaging with the engaging-receiving portion, and
by an impact load acting on the hood and/or the upper cowl-top cover, the first engaging portion moves downward from an engaged position, whereby the upper cowl-top cover and the lower cowl-top cover are disengaged from each other, and a downward movement of the upper cowl-top cover is permitted.

2. The divisional cowl-top cover according to claim 1, wherein
a supporting portion is provided in front of the upper cowl-top cover main body,
a sealing member coming into pressure contact with a lower face of the hood is provided at one end part of the supporting portion,
the first engaging portion is provided at the other end part of the supporting portion, and
the one end part of the supporting portion is arranged in an inclined position to the front glass side or front side.

3. The divisional cowl-top cover according to claim 1, wherein
a supporting portion is provided in front of the upper cowl-top cover main body,
a sealing member coming into pressure contact with a lower face of the hood is provided at one end part of the supporting portion,
the first engaging portion is provided at the other end part of the supporting portion,
at the other end part of the supporting portion or at an upper end part of the lower cowl-top cover main body, an engaging-receiving portion having the engagement hole penetrating in a substantially vertical direction is constructed as the first engaging portion or the second engaging portion, and
at the upper end part of the lower cowl-top cover main body or at the other end part of the supporting portion, the engaging claw which is inserted into the engagement hole and which engages with the engaging-receiving portion is constructed as the other of the second engaging portion or the first engaging portion.

4. The divisional cowl-top cover according to claim 3, wherein
an inclined face which is inclined downward, is formed between an insert opening part of the engagement hole and the engaging claw.

5. The divisional cowl-top cover according to claim 3, wherein
a vulnerable part is formed at the engaging-receiving portion and/or the engaging claw.

6. The divisional cowl-top cover according to claim 1, wherein
by the impact load, the upper cowl-top cover and the lower cowl-top cover are disengaged from each other engaged state, and by abutment with the upper cowl-top cover moving downward, the lower cowl-top cover is constructed so as to be rotatable forward.

7. The divisional cowl-top cover according to claim 1, further comprising:
a supporting portion provided in front of the upper cowl-top cover main body; and
a sealing member coming into pressure contact with a lower face of the hood and provided at one end part of the supporting portion,
wherein the first engaging portion is provided at the other end part of the supporting portion, and
the sealing member is in contact with the lower cowl-top cover.

* * * * *